US009588646B2

(12) United States Patent
Cassistat et al.

(10) Patent No.: US 9,588,646 B2
(45) Date of Patent: Mar. 7, 2017

(54) SELECTION AND OPERATIONS ON AXES OF COMPUTER-READABLE FILES AND GROUPS OF AXES THEREOF

(71) Applicant: 9224-5489 QUEBEC INC., Montreal (CA)

(72) Inventors: Francois Cassistat, Montreal (CA); Mathieu Audet, Montreal (CA)

(73) Assignee: 9224-5489 QUEBEC INC., Montreal (CA)

( * ) Notice: Subject to any disclaimer, the term of this patent is extended or adjusted under 35 U.S.C. 154(b) by 336 days.

(21) Appl. No.: 13/798,667

(22) Filed: Mar. 13, 2013

(65) Prior Publication Data

US 2013/0198190 A1  Aug. 1, 2013

Related U.S. Application Data

(63) Continuation of application No. 13/244,513, filed on Sep. 25, 2011.
(Continued)

(51) Int. Cl.
*G06F 17/00* (2006.01)
*G06F 3/0482* (2013.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC ... G06F 3/0481; G06F 3/04817; G06F 3/0482
See application file for complete search history.

(56) References Cited

U.S. PATENT DOCUMENTS 4,616,336 A  10/1986  Robertson
4,653,021 A   3/1987  Takagi
(Continued)

FOREIGN PATENT DOCUMENTS

CA  2323268  4/2002
EP  2568369  9/2009
(Continued)

OTHER PUBLICATIONS

The lifestream approach to reorganizing the information world; Nicolas Carriero, Scott Fertig; Eric Freeman and David Gelernter; Apr. 1995; Yale University.

*Primary Examiner* — Keith Bloomquist
(74) *Attorney, Agent, or Firm* — Mathieu Audet

(57) ABSTRACT

An embodiment of the present invention provides a method of applying a set function on documents in an axis-based interface, the method comprising grouping a plurality of documents in a plurality of axes of documents, the documents from each axis of documents having commonality, grouping a plurality of axes of documents in a group of axes of documents, the documents from the group of axes of documents being disposed along a collation function, wherein at least some of the axes of documents are adapted to be used by a set function adapted to mathematically collectively manipulate documents thereof. Groups of axes of documents are also adapted to be used by a set function adapted to mathematically collectively manipulate documents thereof.

18 Claims, 29 Drawing Sheets

Related U.S. Application Data

(60) Provisional application No. 61/438,609, filed on Feb. 1, 2011.

(51) Int. Cl.
    *G06F 3/0484* (2013.01)
    *H04L 29/08* (2006.01)
    *G06F 17/30* (2006.01)
    *G06F 3/0481* (2013.01)

(52) U.S. Cl.
    CPC .. *G06F 17/30011* (2013.01); *G06F 17/30598* (2013.01); *H04L 67/02* (2013.01)

(56) References Cited

U.S. PATENT DOCUMENTS

| | | |
|---|---|---|
| 4,817,036 A | 3/1989 | Millet et al. |
| 5,115,504 A | 5/1992 | Belove |
| 5,148,154 A | 9/1992 | MacKay |
| 5,241,624 A | 8/1993 | Torres |
| 5,261,087 A | 11/1993 | Makaino |
| 5,353,391 A | 10/1994 | Cohen |
| 5,388,197 A | 2/1995 | Rayner |
| 5,398,074 A | 3/1995 | Duffield |
| 5,414,811 A | 5/1995 | Parulski et al. |
| 5,499,330 A | 3/1996 | Lucas et al. |
| 5,519,828 A | 5/1996 | Rayner |
| 5,524,195 A | 6/1996 | Clanton |
| 5,535,063 A | 7/1996 | Lamming |
| 5,537,524 A | 7/1996 | Aprile |
| 5,546,528 A | 8/1996 | Johnston |
| 5,581,752 A | 12/1996 | Inoue |
| 5,598,519 A | 1/1997 | Narayanan |
| 5,602,596 A | 2/1997 | Claussen |
| 5,606,374 A | 2/1997 | Bertram |
| 5,621,456 A | 4/1997 | Florin |
| 5,621,874 A | 4/1997 | Lucas |
| 5,623,613 A | 4/1997 | Rowe |
| 5,634,064 A | 5/1997 | Warnock |
| 5,649,182 A | 7/1997 | Reitz |
| 5,659,742 A | 8/1997 | Beattie |
| 5,663,757 A | 9/1997 | Morales |
| 5,671,381 A | 9/1997 | Strasnick |
| 5,673,401 A | 9/1997 | Volk |
| 5,677,708 A | 10/1997 | Matthews |
| 5,680,605 A | 10/1997 | Torres |
| 5,682,511 A | 10/1997 | Sposato |
| 5,689,287 A | 11/1997 | Mackinlay |
| 5,701,500 A | 12/1997 | Ikeo |
| 5,713,031 A | 1/1998 | Saito |
| 5,740,815 A | 4/1998 | Alpins |
| 5,751,280 A | 5/1998 | Abbott |
| 5,781,188 A | 7/1998 | Amiot |
| 5,781,785 A | 7/1998 | Rowe |
| 5,786,816 A | 7/1998 | Macrae |
| 5,794,178 A | 8/1998 | Caid |
| 5,798,766 A | 8/1998 | Hayashi et al. |
| 5,812,124 A | 9/1998 | Eick |
| 5,822,751 A | 10/1998 | Gray |
| 5,832,504 A | 11/1998 | Tripathi |
| 5,838,317 A | 11/1998 | Bolnick |
| 5,838,326 A | 11/1998 | Card |
| 5,847,707 A | 12/1998 | Hayashida |
| 5,850,218 A | 12/1998 | LaJoie |
| 5,878,410 A | 3/1999 | Zbikowski |
| 5,880,729 A | 3/1999 | Johnston, Jr. |
| 5,900,879 A | 5/1999 | Berry |
| 5,903,271 A | 5/1999 | Bardon |
| 5,905,992 A | 5/1999 | Lucas |
| 5,920,859 A | 7/1999 | Li |
| 5,926,824 A | 7/1999 | Hashimoto |
| 5,933,843 A | 8/1999 | Takai |
| 5,966,127 A | 10/1999 | Yajima |
| 5,974,391 A | 10/1999 | Hongawa et al. |
| 5,977,974 A | 11/1999 | Hatori et al. |
| 5,980,096 A | 11/1999 | Thalhammer-Reyero |
| 5,982,369 A | 11/1999 | Sciammarella |
| 5,999,173 A | 12/1999 | Ubillos |
| 6,003,034 A | 12/1999 | Thli |
| 6,005,601 A | 12/1999 | Ohkura |
| 6,006,227 A | 12/1999 | Freeman |
| 6,009,442 A | 12/1999 | Chen |
| 6,012,072 A | 1/2000 | Lucas |
| 6,020,930 A | 2/2000 | Legrand |
| 6,023,703 A | 2/2000 | Hill |
| 6,028,600 A | 2/2000 | Rosin |
| 6,029,164 A | 2/2000 | Birrell |
| 6,037,933 A | 3/2000 | Blonstein |
| 6,038,522 A | 3/2000 | Manson et al. |
| 6,061,062 A | 5/2000 | Venolia |
| 6,064,384 A | 5/2000 | Ho |
| 6,067,554 A | 5/2000 | Hohensee |
| 6,078,924 A | 6/2000 | Ainsbury |
| 6,081,817 A | 6/2000 | Taguchi |
| 6,088,032 A | 7/2000 | Mackinlay |
| 6,100,887 A | 8/2000 | Bormann et al. |
| 6,108,657 A | 8/2000 | Shoup |
| 6,111,578 A | 8/2000 | Tesler |
| 6,119,120 A | 9/2000 | Miller |
| 6,149,519 A | 11/2000 | Osaki |
| 6,151,059 A | 11/2000 | Schein |
| 6,151,604 A | 11/2000 | Wlaschin |
| 6,151,702 A | 11/2000 | Overturf |
| 6,163,345 A | 12/2000 | Noguchi |
| 6,174,845 B1 | 1/2001 | Rattinger |
| 6,175,362 B1 | 1/2001 | Harms |
| 6,175,845 B1 | 1/2001 | Smith |
| 6,185,551 B1 | 2/2001 | Birrell |
| 6,188,406 B1 | 2/2001 | Fong |
| 6,189,012 B1 | 2/2001 | Mital |
| 6,202,068 B1 | 3/2001 | Kraay |
| 6,211,873 B1 | 4/2001 | Moyer |
| 6,236,994 B1 | 5/2001 | Swartz |
| 6,237,004 B1 | 5/2001 | Dodson |
| 6,240,421 B1 | 5/2001 | Stolarz |
| 6,243,093 B1 | 6/2001 | Czerwinski |
| 6,243,724 B1 | 6/2001 | Mander |
| 6,253,218 B1 | 6/2001 | Aoki |
| 6,253,518 B1 | 7/2001 | Azar |
| 6,262,722 B1 | 7/2001 | Allison |
| 6,266,059 B1 | 7/2001 | Matthews |
| 6,266,098 B1 | 7/2001 | Cove |
| 6,275,229 B1 | 8/2001 | Weiner |
| 6,281,898 B1 | 8/2001 | Nikolovska |
| 6,281,940 B1 | 8/2001 | Sciammarella |
| 6,289,362 B1 | 9/2001 | Van Der Meer |
| 6,295,639 B1 | 9/2001 | Van Der Meer |
| 6,308,187 B1 | 10/2001 | Destefano |
| 6,310,622 B1 | 10/2001 | Asente |
| 6,313,851 B1 | 11/2001 | Matthews |
| 6,317,761 B1 | 11/2001 | Landsman et al. |
| 6,335,742 B1 | 1/2002 | Takemoto |
| 6,337,698 B1 | 1/2002 | Keely, Jr. |
| 6,338,044 B1 | 1/2002 | Cook et al. |
| 6,344,880 B1 | 2/2002 | Takahashi |
| 6,351,765 B1 | 2/2002 | Pietropaolo |
| 6,353,436 B1 | 3/2002 | Reichlen |
| 6,353,831 B1 | 3/2002 | Gustman |
| 6,366,299 B1 | 4/2002 | Lanning |
| 6,381,362 B1 | 4/2002 | Desphande et al. |
| 6,388,665 B1 | 5/2002 | Linnett |
| 6,392,651 B1 | 5/2002 | Stradley |
| 6,418,556 B1 | 7/2002 | Bennington |
| 6,425,129 B1 | 7/2002 | Sciammarella |
| 6,434,545 B1 | 8/2002 | MacLeod et al. |
| 6,434,598 B1 | 8/2002 | Gish |
| 6,456,938 B1 | 9/2002 | Barnard |
| 6,457,006 B1 | 9/2002 | Gruenwald |
| 6,457,017 B2 | 9/2002 | Watkins |
| 6,463,431 B1 | 10/2002 | Schmitt |
| 6,466,237 B1 | 10/2002 | Miyao et al. |
| 6,487,557 B1 | 11/2002 | Nagatomo et al. |
| 6,491,585 B1 | 12/2002 | Miyamoto |
| 6,501,469 B1 | 12/2002 | MacPhail |

(56) References Cited

U.S. PATENT DOCUMENTS

| | | |
|---|---|---|
| 6,507,858 B1 | 1/2003 | Kanerva |
| 6,538,672 B1 | 3/2003 | Dobbelaar |
| 6,542,896 B1 | 4/2003 | Gruenwald |
| 6,553,310 B1 | 4/2003 | Lopke |
| 6,556,225 B1 | 4/2003 | MacPhail |
| 6,577,350 B1 | 6/2003 | Proehl |
| 6,581,068 B1 | 6/2003 | Bensoussan et al. |
| 6,587,106 B1 | 7/2003 | Suzuki et al. |
| 6,594,673 B1 | 7/2003 | Smith |
| 6,598,043 B1 | 7/2003 | Baclawski |
| 6,600,501 B1 | 7/2003 | Israel |
| D478,090 S | 8/2003 | Nguyen |
| 6,604,144 B1 | 8/2003 | Anders |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,662,357 B1 | 12/2003 | Bowman-Amuah |
| 6,668,102 B2 | 12/2003 | Chiba |
| 6,671,692 B1 | 12/2003 | Marpe |
| 6,671,693 B1 | 12/2003 | Marpe |
| 6,671,694 B2 | 12/2003 | Baskins et al. |
| 6,675,158 B1 | 1/2004 | Rising |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs et al. |
| 6,690,391 B1 | 2/2004 | Proehl |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,721,760 B1 | 4/2004 | Ono et al. |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,744,447 B2 | 6/2004 | Estrada et al. |
| 6,744,967 B2 | 6/2004 | Kaminski et al. |
| 6,754,660 B1 | 6/2004 | MacPhail |
| 6,760,721 B1 | 7/2004 | Chasen |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright et al. |
| 6,879,946 B2 | 4/2005 | Rong |
| 6,889,220 B2 | 5/2005 | Wolff |
| 6,900,807 B1 | 5/2005 | Liongosari et al. |
| 6,901,558 B1 | 5/2005 | Andreas et al. |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording et al. |
| 6,934,916 B1 | 8/2005 | Webb et al. |
| 6,948,124 B2 | 9/2005 | Combs |
| 6,961,900 B1 | 11/2005 | Sprague et al. |
| 6,965,380 B1 | 11/2005 | Kumata et al. |
| 6,973,628 B2 | 12/2005 | Asami |
| 6,983,227 B1 | 1/2006 | Thalhammer-Reyero et al. |
| 6,985,948 B2 | 1/2006 | Taguchi et al. |
| 6,987,220 B2 | 1/2006 | Holcombe |
| 6,990,637 B2 | 1/2006 | Anthony |
| 7,007,034 B1 | 2/2006 | Hartman |
| 7,010,744 B1 | 3/2006 | Torgerson |
| 7,019,741 B2 | 3/2006 | Kelly et al. |
| 7,020,848 B2 | 3/2006 | Rosenzweig |
| 7,054,878 B2 | 5/2006 | Gottsman |
| 7,055,104 B1 | 5/2006 | Billmaier |
| 7,075,550 B2 | 7/2006 | Bonadio |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,218,325 B1 | 5/2007 | Buck |
| 7,220,910 B2 | 5/2007 | Plastina |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski et al. |
| 7,293,228 B1 | 11/2007 | Lessing et al. |
| 7,302,649 B2 | 11/2007 | Ohnishi |
| 7,318,196 B2 | 1/2008 | Crow et al. |
| 7,334,191 B1 | 2/2008 | Sivan |
| 7,336,279 B1 | 2/2008 | Takiguchi |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,363,591 B2 | 4/2008 | Goldthwaite |
| 7,366,994 B2 | 4/2008 | Loui |
| 7,372,473 B2 | 5/2008 | Venolia |
| 7,380,260 B1 | 5/2008 | Billmaier |
| 7,418,674 B2 | 8/2008 | Robbins |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi et al. |
| 7,461,088 B2 | 12/2008 | Thorman |
| 7,502,819 B2 | 3/2009 | Alonso |
| D589,972 S | 4/2009 | Casagrande et al. |
| 7,594,246 B1 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| D614,197 S | 4/2010 | Casagrande |
| 7,703,040 B2 | 4/2010 | Cutrell |
| 7,710,423 B2 | 5/2010 | Drucker et al. |
| 7,714,859 B2 | 5/2010 | Shoemaker |
| 7,716,194 B2 | 5/2010 | Williams |
| 7,716,604 B2 | 5/2010 | Kataoka |
| 7,735,102 B1 | 6/2010 | Billmaier |
| 7,739,598 B2 | 6/2010 | Porter |
| 7,739,622 B2 | 6/2010 | DeLine |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,770,217 B2 | 8/2010 | Pueblas |
| 7,788,247 B2 | 8/2010 | Wang |
| 7,788,592 B2 | 8/2010 | William |
| 7,792,328 B2 | 9/2010 | Albertson et al. |
| 7,818,378 B2 | 10/2010 | Buchheit et al. |
| 7,822,735 B2 | 10/2010 | Suda |
| 7,844,074 B2 | 11/2010 | Moskowitz et al. |
| 7,856,424 B2 | 12/2010 | Cisler |
| 7,870,489 B2 | 1/2011 | Serita |
| 7,899,818 B2 | 3/2011 | Stonehocker |
| 7,902,741 B2 | 3/2011 | Iwanaga |
| 7,949,691 B1 | 5/2011 | Franciscus de Heer |
| 7,962,522 B2 | 6/2011 | Norris, III |
| 7,991,720 B2 | 8/2011 | Mander |
| 8,001,481 B2 | 8/2011 | Chakra, et al. |
| 8,010,508 B2 | 8/2011 | Audet |
| 8,010,892 B2 | 8/2011 | Audet |

(56) References Cited

U.S. PATENT DOCUMENTS

| | | |
|---|---|---|
| 8,010,903 B2 | 8/2011 | Dieberger |
| 8,069,404 B2 | 11/2011 | Audet |
| 8,078,966 B2 | 12/2011 | Audet |
| 8,091,033 B2 | 1/2012 | von Sichart |
| 8,099,680 B1 | 1/2012 | Kolde |
| 8,136,030 B2 | 3/2012 | Audet |
| 8,151,185 B2 | 4/2012 | Audet |
| 8,307,355 B2 | 11/2012 | Capomassi |
| 8,438,188 B2 | 5/2013 | Norris, III |
| 8,468,467 B2 * | 6/2013 | Yamashita .......... G06F 17/3028 715/767 |
| 8,707,169 B2 | 4/2014 | Morita |
| 8,762,380 B2 | 6/2014 | Shirai |
| 2001/0003186 A1 | 6/2001 | DeStefano |
| 2001/0025288 A1 | 9/2001 | Yanase |
| 2001/0034766 A1 | 10/2001 | Morimoto |
| 2001/0055017 A1 | 12/2001 | Ording |
| 2002/0032696 A1 | 3/2002 | Takiguchi |
| 2002/0033848 A1 | 3/2002 | Sclammarello |
| 2002/0035563 A1 | 3/2002 | Suda |
| 2002/0056129 A1 | 5/2002 | Blackketter |
| 2002/0059215 A1 | 5/2002 | Kotani et al. |
| 2002/0070958 A1 | 6/2002 | Yeo |
| 2002/0078440 A1 | 6/2002 | Feinberg |
| 2002/0087530 A1 | 7/2002 | Smith |
| 2002/0091739 A1 | 7/2002 | Ferlitsch |
| 2002/0096831 A1 | 7/2002 | Nakayama |
| 2002/0101458 A1 | 8/2002 | SanGiovanni |
| 2002/0105541 A1 | 8/2002 | Endou |
| 2002/0140719 A1 | 10/2002 | Amir |
| 2002/0140740 A1 | 10/2002 | Chen |
| 2002/0152474 A1 | 10/2002 | Dudkiewicz |
| 2002/0180795 A1 | 12/2002 | Wright et al. |
| 2003/0001898 A1 | 1/2003 | Bernhardson |
| 2003/0001901 A1 | 1/2003 | Crinon et al. |
| 2003/0030664 A1 | 2/2003 | Parry |
| 2003/0037051 A1 | 2/2003 | Gruenwald |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0090524 A1 | 5/2003 | Segerberg |
| 2003/0093260 A1 | 5/2003 | Dagtas |
| 2003/0093792 A1 | 5/2003 | Labeeb |
| 2003/0095149 A1 | 5/2003 | Fredriksson |
| 2003/0120681 A1 | 6/2003 | Baclawski |
| 2003/0120737 A1 | 6/2003 | Lytle |
| 2003/0121055 A1 | 6/2003 | Kaminski et al. |
| 2003/0128228 A1 | 7/2003 | Crow et al. |
| 2003/0132971 A1 | 7/2003 | Billmaier |
| 2003/0140023 A1 | 7/2003 | Ferguson |
| 2003/0142136 A1 | 7/2003 | Carter |
| 2003/0149939 A1 | 8/2003 | Hubel |
| 2003/0156119 A1 | 8/2003 | Bonadio |
| 2003/0163468 A1 | 8/2003 | Freeman |
| 2003/0167902 A1 | 9/2003 | Hiner |
| 2003/0190950 A1 | 10/2003 | Matsumoto |
| 2003/0206201 A1 | 11/2003 | Ly |
| 2003/0237047 A1 | 12/2003 | Borson |
| 2004/0003398 A1 | 1/2004 | Donian et al. |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0095376 A1 | 5/2004 | Graham |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0143598 A1 | 7/2004 | Drucker |
| 2004/0150657 A1 | 8/2004 | Wittenburg |
| 2004/0160416 A1 | 8/2004 | Venolia |
| 2004/0172593 A1 | 9/2004 | Wong |
| 2004/0177319 A1 | 9/2004 | Horn |
| 2004/0189827 A1 | 9/2004 | Kim |
| 2004/0233238 A1 | 11/2004 | Lahdesmaki |
| 2004/0233239 A1 | 11/2004 | Lahdesmaki |
| 2004/0263519 A1 | 12/2004 | Andrews |
| 2005/0022132 A1 | 1/2005 | Herzberg |
| 2005/0060343 A1 | 3/2005 | Gottsman |
| 2005/0060667 A1 | 3/2005 | Robins |
| 2005/0119936 A1 | 6/2005 | Buchanan et al. |
| 2005/0131959 A1 | 6/2005 | Thorman |
| 2005/0138066 A1 | 6/2005 | Finke-Anlauff |
| 2005/0210410 A1 | 9/2005 | Ohwa |
| 2005/0234843 A1 | 10/2005 | Beckius |
| 2005/0262533 A1 | 11/2005 | Hart |
| 2005/0289482 A1 | 12/2005 | Anthony |
| 2006/0000484 A1 | 1/2006 | Romanchik |
| 2006/0004848 A1 | 1/2006 | Williams |
| 2006/0013554 A1 | 1/2006 | Poslinski et al. |
| 2006/0013555 A1 | 1/2006 | Poslinski et al. |
| 2006/0013556 A1 | 1/2006 | Poslinski et al. |
| 2006/0013557 A1 | 1/2006 | Poslinski et al. |
| 2006/0020966 A1 | 1/2006 | Poslinski et al. |
| 2006/0020971 A1 | 1/2006 | Poslinski et al. |
| 2006/0041521 A1 | 2/2006 | Oral |
| 2006/0045470 A1 | 3/2006 | Poslinski et al. |
| 2006/0075338 A1 | 4/2006 | Kusakabe |
| 2006/0107096 A1 | 5/2006 | Findleton |
| 2006/0116994 A1 | 6/2006 | Jonker |
| 2006/0136466 A1 | 6/2006 | Weiner |
| 2006/0143574 A1 | 6/2006 | Ito |
| 2006/0156246 A1 | 7/2006 | Williams |
| 2006/0161867 A1 | 7/2006 | Drucker |
| 2006/0197782 A1 | 9/2006 | Sellers |
| 2006/0209069 A1 | 9/2006 | Bacigalupi et al. |
| 2006/0236251 A1 | 10/2006 | Kataoka |
| 2006/0242178 A1 | 10/2006 | Butterfield |
| 2006/0248129 A1 | 11/2006 | Carnes |
| 2006/0259511 A1 | 11/2006 | Boerries |
| 2006/0271884 A1 | 11/2006 | Hurst |
| 2006/0277478 A1 | 12/2006 | Seraji |
| 2007/0005576 A1 | 1/2007 | Cutrell |
| 2007/0007884 A1 | 1/2007 | Iwanaga |
| 2007/0024722 A1 | 2/2007 | Eura |
| 2007/0061745 A1 | 3/2007 | Anthony |
| 2007/0061855 A1 | 3/2007 | Serita |
| 2007/0067290 A1 | 3/2007 | Makela |
| 2007/0083505 A1 | 4/2007 | Ferrari |
| 2007/0083527 A1 | 4/2007 | Walder et al. |
| 2007/0094615 A1 | 4/2007 | Endo |
| 2007/0100842 A1 | 5/2007 | Wykes |
| 2007/0120856 A1 | 5/2007 | De Ruyter |
| 2007/0136687 A1 | 6/2007 | Pak |
| 2007/0143803 A1 | 6/2007 | Lim et al. |
| 2007/0156654 A1 | 7/2007 | Ravinarayanan |
| 2007/0168877 A1 | 7/2007 | Jain et al. |
| 2007/0171224 A1 | 7/2007 | MacPherson |
| 2007/0185826 A1 | 8/2007 | Brice |
| 2007/0192749 A1 | 8/2007 | Baudisch |
| 2007/0204218 A1 | 8/2007 | Weber |
| 2007/0208679 A1 | 9/2007 | Tseng |
| 2007/0214169 A1 | 9/2007 | Audet |
| 2007/0216694 A1 | 9/2007 | Audet |
| 2007/0220209 A1 | 9/2007 | Maeda et al. |
| 2007/0239676 A1 | 10/2007 | Stonehocker |
| 2007/0271508 A1 | 11/2007 | Audet |
| 2008/0000126 A1 | 1/2008 | Teza |
| 2008/0015911 A1 | 1/2008 | Wang |
| 2008/0016142 A1 | 1/2008 | Schneider |
| 2008/0019371 A1 | 1/2008 | Anschutz |
| 2008/0022199 A1 | 1/2008 | Sako |
| 2008/0024444 A1 | 1/2008 | Abe |
| 2008/0046844 A1 | 2/2008 | Sugie |
| 2008/0058106 A1 | 3/2008 | Audet |
| 2008/0059897 A1 | 3/2008 | Dilorenzo |
| 2008/0065995 A1 | 3/2008 | Bell |
| 2008/0071822 A1 | 3/2008 | Audet |
| 2008/0072169 A1 | 3/2008 | Audet |
| 2008/0077756 A1 | 3/2008 | Shibata |
| 2008/0092038 A1 | 4/2008 | Audet |
| 2008/0098323 A1 | 4/2008 | Vallone et al. |

(56) References Cited

U.S. PATENT DOCUMENTS

| | | |
|---|---|---|
| 2008/0104534 A1 | 5/2008 | Park et al. |
| 2008/0111826 A1 | 5/2008 | Endrikhovski |
| 2008/0118219 A1 | 5/2008 | Chang et al. |
| 2008/0133579 A1 | 6/2008 | Lim |
| 2008/0134013 A1 | 6/2008 | Audet |
| 2008/0134022 A1 | 6/2008 | Audet |
| 2008/0140448 A1 | 6/2008 | Hernandez |
| 2008/0141115 A1 | 6/2008 | Audet |
| 2008/0155474 A1 | 6/2008 | Duhig |
| 2008/0163048 A1 | 7/2008 | Gossweiler, III |
| 2008/0174790 A1 | 7/2008 | Noguchi |
| 2008/0184285 A1 | 7/2008 | Park |
| 2008/0186305 A1 | 8/2008 | Carter |
| 2008/0243778 A1 | 10/2008 | Behnen |
| 2008/0244437 A1 | 10/2008 | Fischer et al. |
| 2008/0256473 A1 | 10/2008 | Chakra et al. |
| 2008/0256474 A1 | 10/2008 | Chakra et al. |
| 2008/0270361 A1 | 10/2008 | Meyer |
| 2008/0270928 A1 | 10/2008 | Chakra et al. |
| 2008/0282198 A1 | 11/2008 | Brooks |
| 2008/0294651 A1 | 11/2008 | Masuyama |
| 2008/0295016 A1 | 11/2008 | Audet |
| 2008/0295036 A1 | 11/2008 | Ikeda |
| 2008/0298697 A1 | 12/2008 | Lee |
| 2008/0299989 A1 | 12/2008 | King |
| 2008/0301562 A1 | 12/2008 | Berger |
| 2008/0307343 A1 | 12/2008 | Robert |
| 2008/0307348 A1 | 12/2008 | Jones et al. |
| 2009/0018996 A1 | 1/2009 | Hunt |
| 2009/0019371 A1 | 1/2009 | Audet |
| 2009/0048981 A1 | 2/2009 | Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1 | 2/2009 | Audet |
| 2009/0055776 A1 | 2/2009 | Audet |
| 2009/0063552 A1 | 3/2009 | Jones |
| 2009/0064029 A1 | 3/2009 | Corkran |
| 2009/0064143 A1 | 3/2009 | Bhogal et al. |
| 2009/0070662 A1 | 3/2009 | Audet |
| 2009/0070699 A1 | 3/2009 | Birkill et al. |
| 2009/0083260 A1 | 3/2009 | Artom |
| 2009/0083859 A1 | 3/2009 | Roth et al. |
| 2009/0106684 A1 | 4/2009 | Chakra et al. |
| 2009/0106685 A1 | 4/2009 | Care et al. |
| 2009/0113334 A1 | 4/2009 | Chakra et al. |
| 2009/0116817 A1 | 5/2009 | Kim et al. |
| 2009/0150832 A1 | 6/2009 | Keller et al. |
| 2009/0164933 A1 | 6/2009 | Pederson et al. |
| 2009/0177754 A1 | 7/2009 | Brezina |
| 2009/0199119 A1 | 8/2009 | Park et al. |
| 2009/0199302 A1 | 8/2009 | So |
| 2009/0210862 A1 | 8/2009 | Viswanadha |
| 2009/0228774 A1 | 9/2009 | Matheny |
| 2009/0228788 A1* | 9/2009 | Audet .................. G06F 17/211 715/273 |
| 2009/0235194 A1 | 9/2009 | Arndt et al. |
| 2009/0254850 A1 | 10/2009 | Almeida |
| 2009/0265372 A1 | 10/2009 | Esmann-Jensen |
| 2009/0284658 A1 | 11/2009 | Cho |
| 2009/0287693 A1* | 11/2009 | Audet ............................... 707/5 |
| 2009/0288006 A1 | 11/2009 | Audet |
| 2009/0307629 A1 | 12/2009 | Horiuchi |
| 2009/0319933 A1 | 12/2009 | Zaika et al. |
| 2010/0023500 A1 | 1/2010 | Bascom |
| 2010/0057576 A1 | 3/2010 | Brodersen et al. |
| 2010/0070919 A1 | 3/2010 | Araumi |
| 2010/0077355 A1 | 3/2010 | Belinsky |
| 2010/0082427 A1 | 4/2010 | Burgener |
| 2010/0082653 A1 | 4/2010 | Nair |
| 2010/0083159 A1 | 4/2010 | Mountain et al. |
| 2010/0094890 A1 | 4/2010 | Bokor |
| 2010/0145976 A1 | 6/2010 | Higgins |
| 2010/0146380 A1 | 6/2010 | Rousso |
| 2010/0150522 A1 | 6/2010 | Schmehl et al. |
| 2010/0169823 A1* | 7/2010 | Audet .......................... 715/784 |
| 2010/0171861 A1 | 7/2010 | Ota et al. |
| 2010/0185509 A1 | 7/2010 | Higgins |
| 2010/0205563 A1 | 8/2010 | Haapsaari |
| 2010/0313158 A1 | 12/2010 | Lee et al. |
| 2010/0313159 A1 | 12/2010 | Decker et al. |
| 2010/0318200 A1 | 12/2010 | Foslien et al. |
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0010667 A1 | 1/2011 | Sakai |
| 2011/0012927 A1 | 1/2011 | Lin |
| 2011/0029925 A1 | 2/2011 | Robert |
| 2011/0035700 A1 | 2/2011 | Meaney |
| 2011/0061082 A1 | 3/2011 | Heo et al. |
| 2011/0078166 A1 | 3/2011 | Oliver |
| 2011/0145745 A1 | 6/2011 | Hyeon et al. |
| 2011/0154213 A1 | 6/2011 | Wheatley et al. |
| 2011/0219297 A1 | 9/2011 | Oda |
| 2011/0239149 A1 | 9/2011 | Lazo |
| 2011/0246926 A1 | 10/2011 | Newton |
| 2011/0307814 A1 | 12/2011 | Audet |
| 2012/0159320 A1 | 6/2012 | Audet |
| 2012/0183273 A1 | 7/2012 | Utsuki |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2012/0262398 A1 | 10/2012 | Kim |
| 2013/0080880 A1 | 3/2013 | Cassistat |
| 2013/0080888 A1 | 3/2013 | Audet |
| 2014/0244625 A1 | 8/2014 | Seghezzi |

FOREIGN PATENT DOCUMENTS

| | | |
|---|---|---|
| JP | 07-013971 | 1/1995 |
| JP | 07-085080 | 3/1995 |
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO9903271 | 1/1999 |
| WO | WO 00/65429 | 11/2000 |
| WO | WO 01/22194 | 3/2001 |
| WO | WO 01/63378 | 8/2001 |
| WO | WO 01/98881 | 12/2001 |
| WO | WO02099241 | 12/2002 |
| WO | WO 03/001345 | 1/2003 |
| WO | WO 03/032199 | 4/2003 |
| WO | WO 2005/045756 | 5/2005 |
| WO | WO 2005/083595 | 9/2005 |
| WO | WO 2007/095997 | 8/2007 |
| WO | WO 2008/030779 | 3/2008 |

* cited by examiner

SELECTION AND OPERATIONS ON AXES OF COMPUTER-READABLE FILES AND GROUPS OF AXES THEREOF

CROSS-REFERENCES

The present application is a continuation of, and claims priority under 35 U.S.C. 120 to, U.S. patent application Ser. No. 13/244,513, filed Sep. 25, 2011, entitled ACTIVE ELEMENTS, which is incorporated herein by reference in its entirety, and which is a nonprovisional of, and claims priority under 35 U.S.C. 119(e) to, U.S. provisional patent application No. 61/438,609, filed on Feb. 1, 2011, entitled ACTIVE AND SELECTED DOCUMENTS ON AXES THEREOF; EXPANDABLE AND COLLAPSIBLE AXES OF DOCUMENTS; NON-HOMOGENEOUS OBJECTS MAGNIFICATION AND REDUCTION, which is incorporated herein by reference in its entirety. Any publication of and any patent issuing from the foregoing U.S. patent applications is hereby incorporated herein by reference. Furthermore, the disclosure of the priority provisional application is contained in the Appendix hereto, which is incorporated herein by reference.

FIELD OF THE INVENTION

This invention relates generally to computer systems and more specifically to a method, a system and an interface that facilitates localization, organization and use of information elements and user-selectable elements in an axis-based GUI. More precisely, the present invention relates to a method of selecting axes of information elements and enabling operations thereon.

BACKGROUND OF THE INVENTION

With the always-increasing amount of documents one has to deal with on a daily basis it becomes harder to manage the documents (or information or file) on an item-by-item basis. An alternative document management system adapted to organize large amount of information would be beneficial to the user.

United States Patent Application Publication No.: US 2007/0214169 A1, published on Sep. 13, 2007 discloses a Multi-dimensional locating system and method (title), which is incorporated herewith by reference. The patent application provides embodiments for managing and displaying axes of documents and other computer-readable files. An axis of documents grouping a plurality of documents along a predetermined order, inter alia, is taught.

The use of an axis of documents brings some specific behavior as oppose to document presentation mechanism in the art. One of the specific of an axis is that one might want to navigate thereon while making selections of documents and seeing a magnified version of a document.

The use of a small number of axes of information elements on a display might result in a non-optimal use of the usable display area. A larger number of axes might be desirable to provide more information to a viewer. A number of challenges need to be addressed in order to provide functions performed on a larger quantity of documents. For instance, the selection of elements needs to be identified in a fashion discriminating the selected elements among the other documents. Additionally, the element on which the focus is also needs to be discriminated.

Also, navigation among a plurality of axes and among a plurality of groups of axes requires particular behaviors that the prior art fails to provide. Other possibilities could also be leveraged by the manipulation of a plurality of axes that the prior art fails to take advantage from.

In view of the prior art it appears that improvements over the prior art is desirable to improve the user experience and usability either with innovative graphical, structural or functional improvements.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This invention generally refers to user-selectable elements that might represent computer-readable files like documents and multimedia assets. Information elements can alternatively be referred to as, user-selectable elements, menu icons or thumbnails that are associated to an attribute, a category or a tag and arranged as explained below. In order to lighten the reading of the present specification, the term "document" is generally used without intending to limit the scope of the present patent application only to documents, unless expressly specified.

Also, the invention is generally described using an assembly of documents called an axis of documents. The axis of documents generally refers to, but is not limited to, a comprehensive graphical layout of documents. Hereinbelow referred to as an axis that is a substantially rectilinear arrangement of documents. The axis might not necessarily be straight but preferably has a consistent shape providing a viewer en indication of continuity therebetween documents disposed thereon. In other words, the axis of documents can be defined by a single axis or a double axis of documents (or more adjacent axes of documents) and the axis can be completely straight, slightly curved, substantially curved, angled, following a particular shape or having a consistent shape over which documents are disposed in a reasonably consistent fashion adapted to allow a viewer to infer a comprehensive suite of documents. The axes presented in the embodiments below are illustrated in the horizontal position while they could be disposed vertically without departing from the scope of the present disclosure.

An embodiment referred to below provides one or more groups of axes comprising documents thereon. Each axis of documents is preferably rectilinear to easily be located adjacent with other axes of documents to efficiently use the useful display area of the display. A system adapted to carry on the embodiments, a user graphical interface adapted to display the embodiments, a method adapted to provides the steps required to enable the embodiments and a medium storing instructions enabling the method once read by a machine are all considered within the scope of the present invention.

Therefore, an embodiment of the present invention provides a plurality of axes of documents adapted to form a group of axes of documents.

An embodiment of the present invention provides a mechanism adapted to visually discriminate a document on an axis of document representing the document in focus for a user.

Another embodiment of the present invention provides an active document on at least one axis of documents.

One embodiment of the present invention provides an active document on each of the axes of documents in a group of axes; the active document of the active axis of documents being adapted to change.

Another embodiment of the present invention provides an active document that is adapted to move between axes of documents.

Another embodiment of the present invention provides a method of selecting an active element along an axis by using keys on a keyboard; by pointing a mouse or another pointing device on a display, moving a body part in a sensing regions of multi-dimensional sensors, and touching a display with a finger (or hovered with a user-managed pointer or with a human body part contacting a touch-screen).

One embodiment of the present invention provides a method of magnifying an active document by displaying the selected document in a magnified fashion on a display.

Another embodiment of the present invention provides an active document on axes of documents that are not selected (e.g. active); the active documents on non-selected axes remaining still when the active document on the active axis moves.

One other embodiment of the present invention provides a method of selecting an active axis of documents among a plurality of axes of documents.

Another embodiment of the present invention provides a visually discriminating method of representing an active axis of documents.

One additional embodiment of the present invention provides a selected axis of documents bordered with enlarged rails or borders.

Another embodiment of the present invention provides an axis that becomes active when an active document is enabled.

An embodiment of the present invention provides a method of selecting documents on an axis of documents.

One other embodiment of the present invention provides a method of selecting a plurality of documents (adjacent or not) on an axis of documents.

Another embodiment of the present invention provides a method of performing actions on selected documents on an axis of documents.

One additional embodiment of the present invention provides to keep documents selected on an axis of documents that is not selected or active.

An embodiment of the present invention provides a mechanism adapted to assemble, or to display, a plurality of groups of axes of documents. One of the groups of axes of documents being active, and/or selected, while the other group(s) of axes being inactive, and/or non-selected. The actions being performed on the active axis of documents on the active group of axes.

Another embodiment of the present invention provides a mechanism adapted to select a group of axes of documents, among a plurality of groups of axes, by selecting a desired axis of documents.

One embodiment of the present invention provides groups of axes of documents that can be reordered therebetween on a graphical user interface by selecting and/or dragging a group of axes to a desired position.

Another embodiment of the present invention provides groups of axes of documents that are adapted to be independently longitudinally moveable and independently magnifyable.

Another embodiment of the present invention provides a non-transitory computer-readable medium having stored thereon computer-executable instructions that, when executed by a processor of a computer system, provide a method of selecting an axis of computer-readable files, the method comprising causing a plurality of axes of computer-readable files to be displayed; and selecting a first axis of computer-readable files, the selected axis of computer-readable files being adapted to perform a set operation thereon effecting computer-readable files from the selected first axis of computer-readable files.

Another embodiment of the present invention provides a computerized system configured to read computer-executable instructions adapted to enable a program enabling an interface adapted to display axes of computer-readable files and identify an active computer-readable file thereon, the computerized system comprising a processing unit configured to process the computer executable instructions; and a display configured to display the interface, the program, when executed, being operative to cause a plurality of axes of computer-readable files to be displayed; and select a first axis of computer-readable files, the selected axis of computer-readable files being adapted to perform a set operation thereon effecting computer-readable files from the selected first axis of computer-readable files.

Another embodiment of the present invention provides a method of applying a set function on documents, the method comprising grouping a plurality of documents in a plurality of axes of documents, the documents from each axis of documents having commonality; grouping a plurality of axes of documents in a group of axes of documents, the documents from the group of axes of documents being disposed along a collation function, wherein at least some of the axes of documents are adapted to be used by a set function adapted to mathematically collectively manipulate documents thereof.

Other advantages might become apparent to the skilled reader of this patent specification in light of the appended drawings.

DESCRIPTION OF EMBODIMENT(S) OF THE INVENTION

Figure 1:
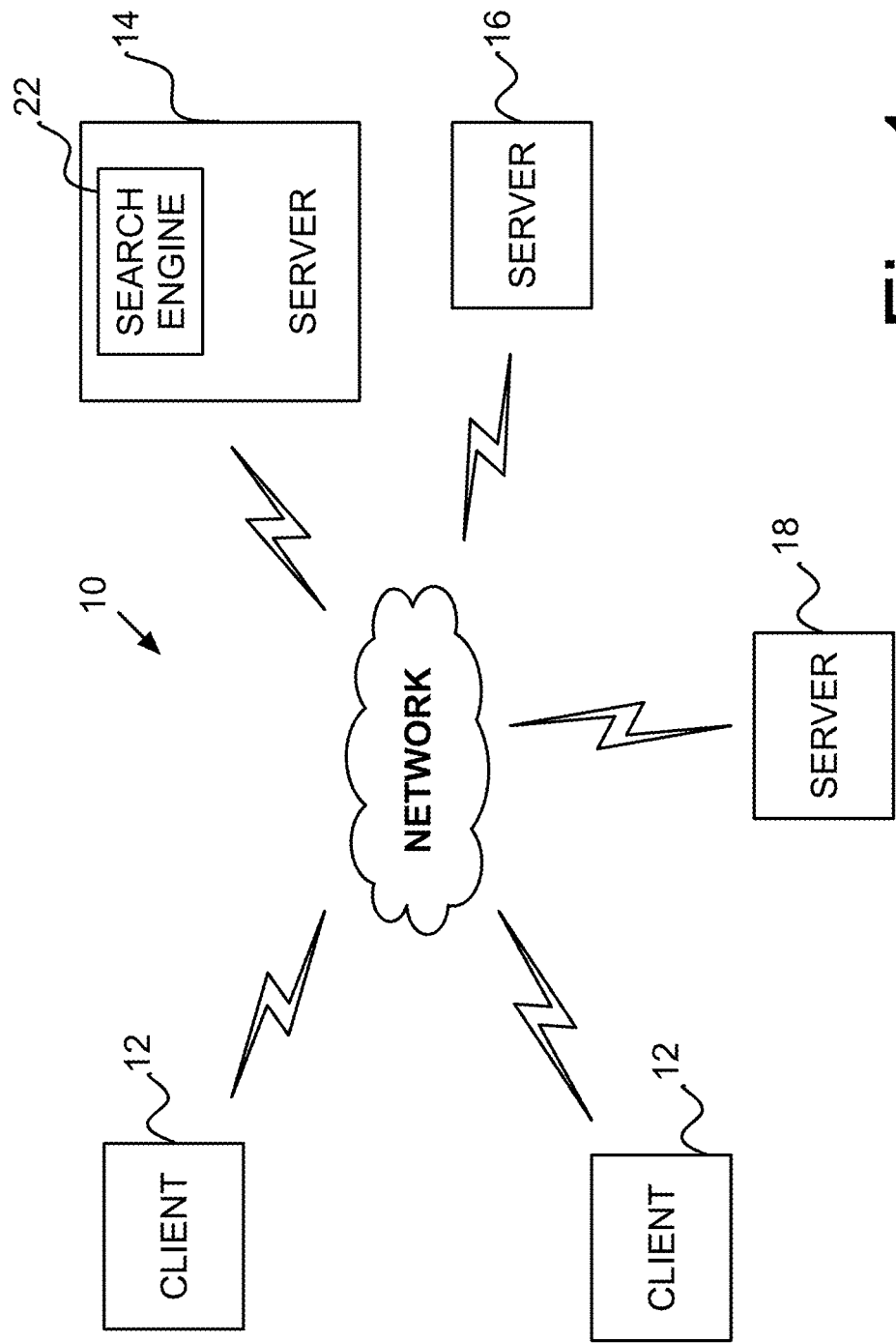
FIG. 1 is a schematic illustration of an exemplary computer network.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The description is separated with subtitles to facilitate its readability. The subtitles include descriptions of portions of invention that might be interrelated despite they might appear under different subtitles. In other words, subtitles are not intended to separate part of the same invention or different inventions described therein but are rather intended to structure the text.

The features provided in this specification mainly relates to basic principles for managing axes of documents. These code/instructions are preferably stored on a machine-readable medium adapted to be read and acted upon to with a computer or a machine having corresponding code/instructions reading capability.

Exemplary Network

FIG. 1 illustrates an exemplary network 10 in which a system and method, consistent with the present invention, may be implemented. The network 10 may include multiple client devices 12 connected to multiple servers 14, 16, 18 via a network 20. The network 20 may include a local area network (LAN), a wide area network (WAN), a telephone network, such as the Public Switched Telephone Network (PSTN), an intranet, the Internet, Wi-Fi, WiMAX or a combination of networks. Two client devices 12 and three servers 14, 16, 18 have been illustrated as connected to network 20 for simplicity. In practice, there may be more or less client devices and servers. Also, in some instances, a client device may perform the functions of a server and a server may perform the functions of a client device.

The client devices 12 may include devices, such as mainframes, minicomputers, personal computers, laptops, personal digital assistants, telephones, or the like, capable of connecting to the network 20. The client devices 12 may transmit data over the network 20 or receive data from the network 20 via a wired, wireless, or optical connection.

The servers 14, 16, 18 may include one or more types of computer systems, such as a mainframe, minicomputer, or personal computer, capable of connecting to the network 20 to enable servers 14, 16, 18 to communicate with the client devices 12. In alternative implementations, the servers 14, 16, 18 may include mechanisms for directly connecting to one or more client devices 12. The servers 14, 16, 18 may transmit data over network 14 or receive data from the network 20 via a wired, wireless, or optical connection.

In an implementation consistent with the present invention, the server 14 may include a search engine 22 usable by the client devices 12. The servers 14 may store documents, such as web pages, accessible by the client devices 12.

Figure 2:
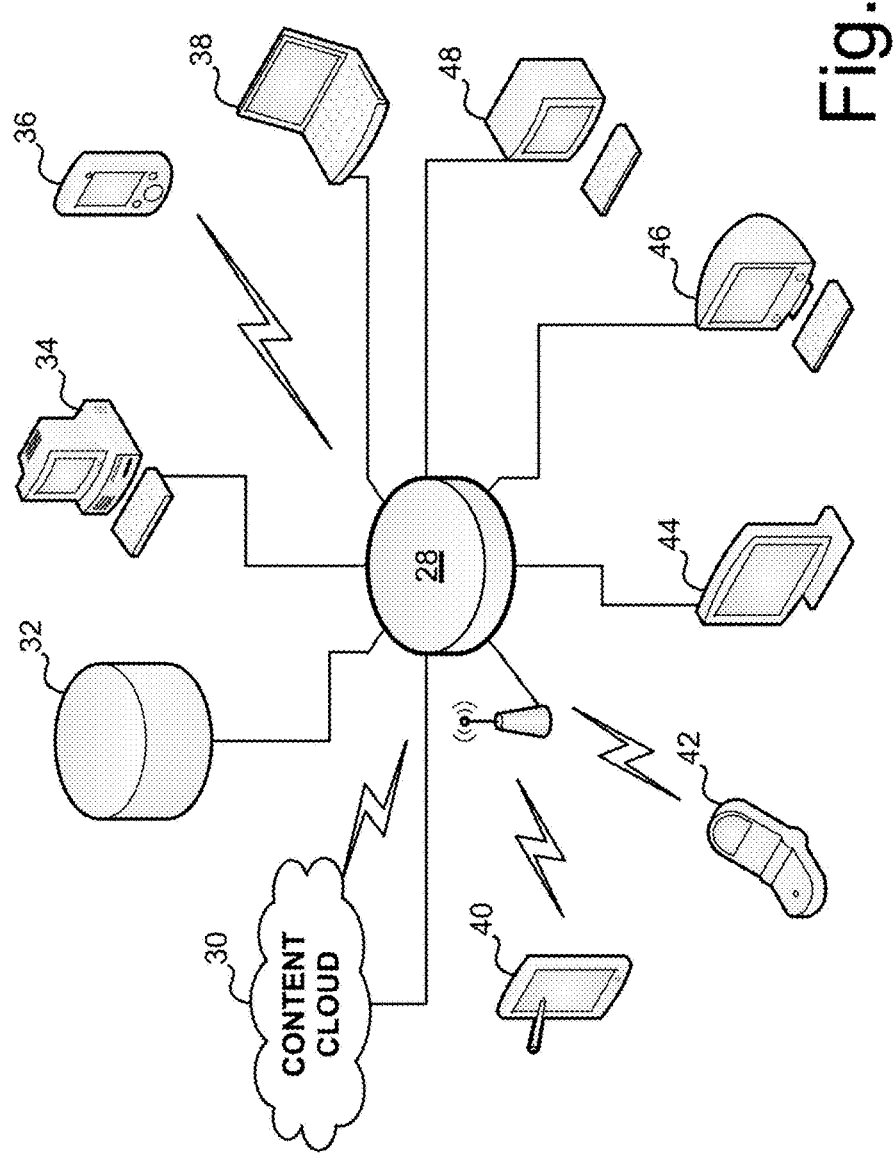
FIG. 2 is a schematic illustration of an exemplary multi-devices network layout.

With reference to FIG. 2, a network 20 includes the content cloud 30, a content database 32, content devices 34-38, and devices 40-48. The network mediator 28 enables the network devices 32-38 to communicate with each other without pre-configuring each device.

The content cloud 30 represent a content source such as the Internet, where content exists at various locations across the globe. The content includes multimedia content such as audio and video. The mediator 28 allows the content cloud to provide content to devices 40-48.

The content database 32 is a storage device that maintains content. The content database 32 may be a stand-alone device on an external communication network. The mediator 28 communicates with the content database 32 to access and retrieve content.

The content devices 34-38 include intelligent devices, such as, for example, personal computers, laptops, cell phones and personal digital assistants. The content devices 32-38 are capable or storing content information.

The devices 40-48 are intelligent devices that receive content from a content source 30-38. However, the devices 30-38 can also operate as servers to distribute content to other client devices.

Exemplary Client Architecture

Figure 3:
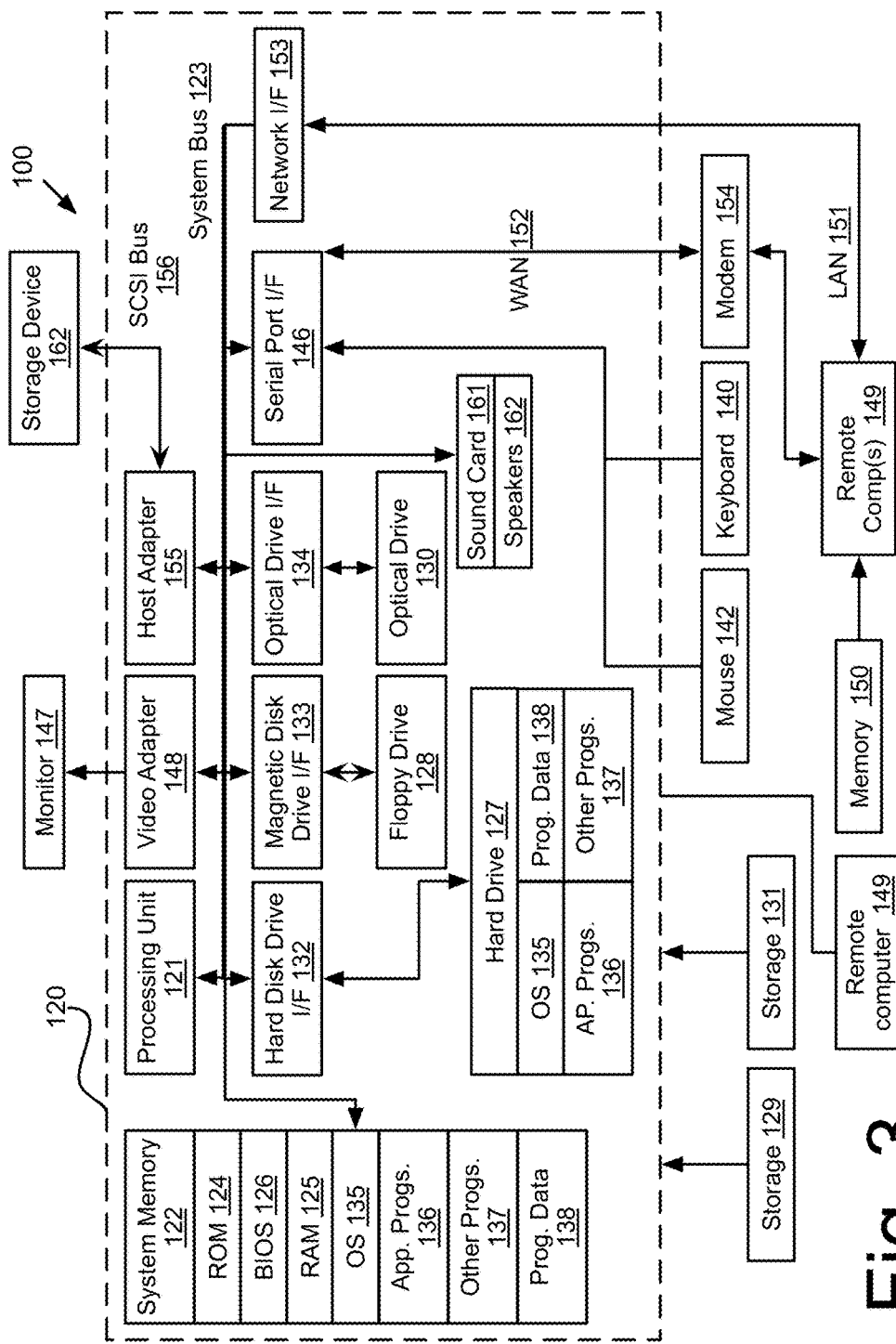
FIG. 3 is a schematic illustration of a typical exemplary computer system.

FIG. 3 and the following discussion provide a brief, general description of an exemplary apparatus in which at least some aspects of the present invention may be implemented. The present invention will be described in the general context of computer-executable instructions, such as program modules, being executed by a personal computer. However, other apparatus may affect the methods of the present invention. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network. In a distributed computing environment, program modules may be located in local and/or remote memory storage devices.

Now, with reference to FIG. 3, an exemplary apparatus 100 for implementing at least some aspects of the present invention includes a general purpose-computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine-readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and information into the personal computer 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the personal computer 120 may include other peripheral output devices (not shown), such as a printer for example. As an alternative or an addition to the video monitor 147, a stereo video output device, such as a head mounted display or LCD shutter glasses for example, could be used.

The personal computer 120 may operate in a networked environment that defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1. The logical connections depicted in FIG. 2 include a local area network (LAN) 14 and a wide area network (WAN) 152, an intranet and the Internet.

When used in a LAN, the personal computer 120 may be connected to the LAN 14 through a network interface adapter (or "NIC") 153. When used in a WAN, such as the Internet, the personal computer 120 may include a modem 154 or other means for establishing communications over the wide area network 152 (e.g. Wi-Fi, WiMax . . . ). The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

The Interface

An interface program providing an interface for managing documents in accordance with an embodiment of the invention is installed on a machine e.g. a computer system. The interface can be programmed using various programming languages e.g. C++, Java or other suitable programming languages. Programming of these languages is well known in the art and is adapted to be readable to provide executable instructions to a hardware system and will not be further described therein. The interface might run through the operating system and the hardware of the computer system or, alternatively, through a network based system e.g. client-server, and/cloud computing system. The interface is adapted to manage documents, computer files, pictures, multimedia content, applications (i.e. computer programs), menu elements, sets of icons and other user-selectable elements in a comprehensive fashion.

Several embodiments follows: Documents are stored on a machine-readable medium and can be retrieved on demand when needed with the interface program. Documents are disposed in an axis-like layout providing a visually comprehensive display arrangement of the documents. The axis can, illustratively, among other possibilities, be based on a selection of attribute(s), tag(s), category(ies), owner of documents, a chronological order, a statistical order or an order representing an increasing file size. Combinations of the above-listed possible choices, inter alia, are possible if desired to build a query adapted to reduce the number of documents to be displayed on the axis. The axis thus helps the viewer to infer additional meaning from the comprehensive layout, consistent display and distribution of the documents thereon.

An axis is adapted to accommodate a single type of documents or, if desired, more than one type of documents, and/or a mix of documents, computer files, multimedia contents and/or user-selectable menu elements. Documents might overlap to squeeze more documents on the space available on the display. Magnification of selected documents on an axis can be made to increase the level of details of the selected documents.

Using an axis of documents helps to meaningfully and intuitively display a group of documents. An axis of documents can be embodied as being a substantially linear distribution of documents adapted to dispose each document to be displayed on a line or on a curved line. A curved or a circular axis of documents is also contemplated to be within the scope of the present disclosure. The exact shape of the axis is secondary, what matters, inter alia, is that the layout structure of an axis provides a comprehensive suite of documents from which a viewer can infer an order, a sequence or a relationship between documents. The display of the axis of documents might be made in accordance with a predetermined order (e.g. chronologically), or not. A chronological distribution of documents can sort documents on a timeline. The chronological order can either be linear or non-linear; meaning that a unit of time has always the same graphical length on the display in the linear configuration. The non-linear configuration might non-evenly display similar units of time because the distribution of documents along the timeline prevails over the linearity of time. Another illustrative embodiment is a group of juxtaposed axes of documents grouped together to form an axis of documents referring to a matrix of documents.

The display of documents on an axis of documents allows to contextually manage documents as a flow, or an ongoing suite, of documents instead of dealing with each document independently. By getting away from managing each document independently it becomes possible to efficiently deal with a significantly higher number of documents and still keep the documents in a structured order.

Each axis of documents assembles documents in accordance with, for example, a selected tag, a category, keywords, or an attribute that is commonly shared among the documents displayed on the axis of documents. The term "attribute" will consistently be used throughout the instant specification to lighten the reading of the text and will include the other commonality between documents described therein unless otherwise specified. The selection of one or more attribute (using Boolean logic for instant) determines which documents will be displayed on the axis of documents. If no specific attribute is selected, then, the axis of documents displays all documents. Thus, all documents on the same axis of documents are normally associated with the selected set or combination of attributes (trivial data, like publicity or specific related information, could be added to an axis as long as the outcome remains a presentation of documents resulting from a query without departing from the scope of the present invention). In addition, a timeline can be used to determine the order of the suite of documents on the axis of documents. Chronological ordering is a very intuitive ordering to humans and is one of the preferred ways to present documents on an axis of documents. In the case of a matrix of documents, then, one axis (e.g. horizontal direction) of the matrix can represent a timeline while the other axis (e.g. vertical direction, orthogonal, . . . ) represents another criterion like, for example, the type of computer files each document relates to. The other axis can also use a timeline if desirable.

The attributes of a document can be selected to create another axis of documents. The attribute of a document from the newly created axis of documents can be selected to create an additional axis of documents and so on so forth. This is what could be called "relational navigation" and is well described in the United States patent application publication referred to at the beginning of the present patent specification. Hence, the user can "navigate" along axes of documents in accordance with their categorization to visualize the documents. Navigation tools are provided with the interface to allow navigation through various axes of documents, when a plurality of axes is enabled, and through the documents of a single axis of documents. In the context of the present invention, a single suite of documents forming an axis along a timeline is one of the preferred embodiments because it is easy to sequentially navigate throughout the documents disposed along the axis. Other graphical layouts of documents might become obvious for a skilled reader in light of the present application and would be considered within the scope of this application.

When only a portion of the axis is visible, a play of zoom, pan and movements along the axis allows a viewer to navigate on the axis and change the document(s) that is (are) displayed on the display. A small display area could display only one document from the axis of documents while the remaining documents from the axis of documents are not displayed but remain nonetheless at their respective "virtual" position on the axis and ready to be displayed if the axis is scrolled to show other documents. In other words, if we consider a mobile platform like a mobile phone having a small display, the small display area might allow to efficiently displaying only one document at the time. However, the displayed document being part of an axis of documents, the other documents on the axis of documents remain displayable in accordance with their respective position on the axis of documents when the axis is scrolled/navigated/gestured.

Figure 4:
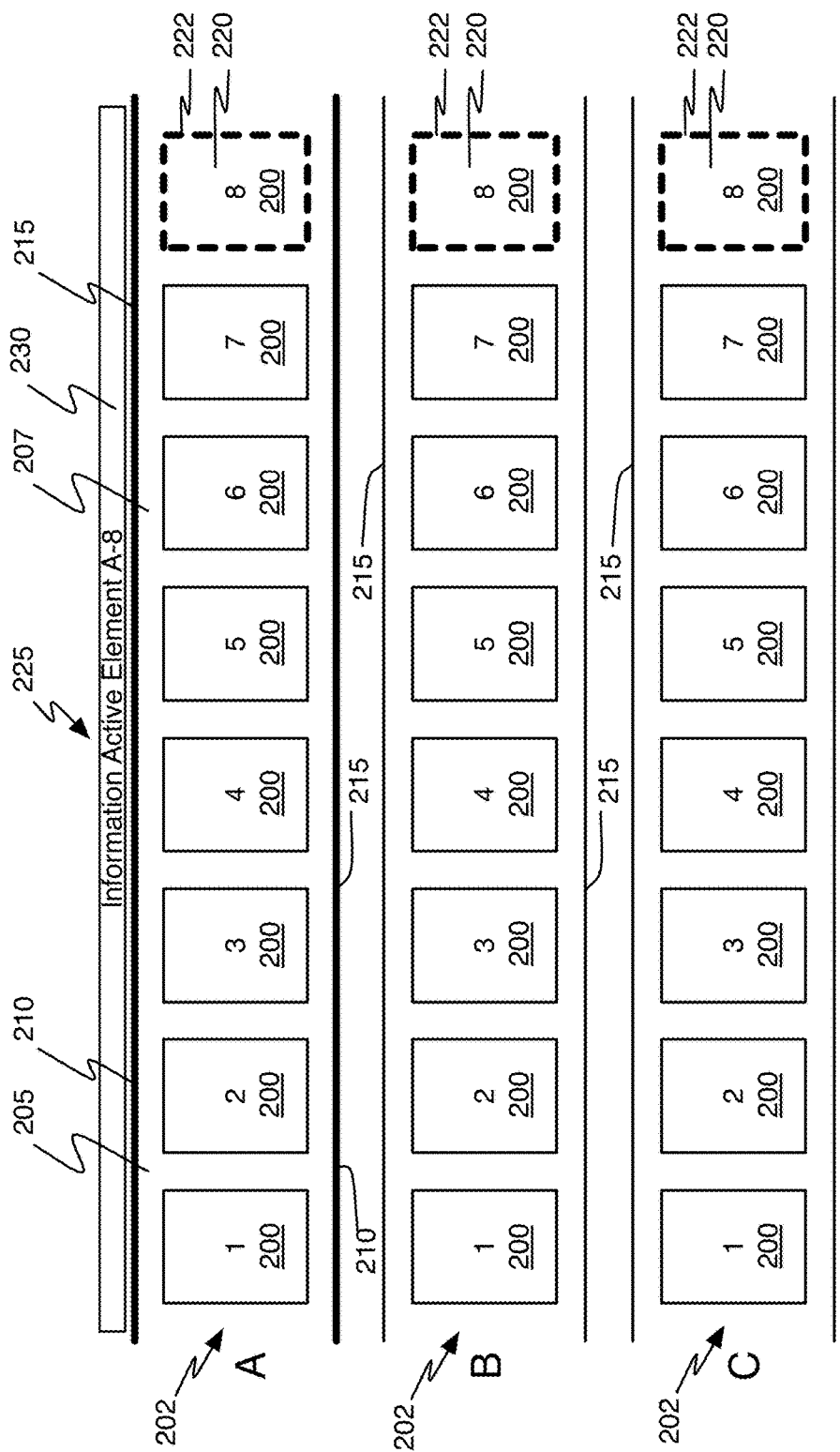
FIG. 4 is a schematic illustration of multiple axes of documents disposed in a longitudinal and parallel arrangement with active documents therein in accordance with an exemplary embodiment of the present invention.

Referring now to FIG. 4, it is possible to appreciate an embodiment depicting a plurality of documents 200 disposed on various axes of documents 202, A, B and C illustratively juxtaposed next to each other. Another embodiment could provide more or less axes of documents 202. One axis of documents 202, in the present situation axis of documents A, 205 has previously been selected and is considered the active axis 207 of documents among the three axes of documents 202, A, B and C.

The selection of an axis of documents 202 to become an active axis of documents 207 can be made via a simple selection performed with a pointing device on a display, hand gestures on a touch sensitive display, body movement gestures in a sensing region of multi-dimensional sensors or other suitable means to influence the selection of the axis 202. A selection of the rails 215, or wherever on the axis of documents, will select the axis of documents. If the selection is made on a document 200 of the axis of documents 202, the pointed document 200 will become the active document 220 in one of the embodiments of the invention. Alternatively, in another embodiment, the active document 220 of a non-selected axis of documents 202 will remain the same until a new active document 220 is selected.

An active document 220 is a document on which the focus is put on instead of the other documents on the same axis or on a plurality of other axes. Specific functions are associated with an active document 220 (or a document in focus). For example, an active document 220 can be magnified in a separate display area to better appreciate the details of the document, rapid change of active documents can rapidly change the magnified document in the separate windows, the active element can change from one document to another document to navigate among documents without loosing selection of other documents, . . . . Conversely, selecting documents allows to act on the selected documents to, for example, copy the document, refresh the thumbnail of the document and so on so forth. In other words, the activation of a document allows actions thereon that are unlikely possible if only a function of selecting documents is provided.

The first axis of documents 202 can be automatically selected when a group of axes of documents 204 is displayed for a first time. A default selected axis of documents 202 can be defined in the group of axes of documents preferences to always get the same selected axis of documents when the group of axes of documents 204 is displayed for the first time.

The active axis of documents A, 205 is visually discriminated by, for example, enlarged axis border, or rails, 210 as opposed to axis rails 215 of unselected axes 202, B and C. Other active axis of documents 205 identification could be used, like a change in color of the axis of documents 205 and a change in color, thickness or texture of the rails 215, without departing from the scope of the present invention.

In one embodiment, each axis of documents 202, A, B and C has an active document 220 illustratively identified with a bolder dotted border 222. In the present situation, documents A-8, B-8 and C-8 are identified as active documents 220.

In the present embodiment, only the active document 220 A-8 of the active axis A, 205 can be acted upon without changing the selected axis of documents. For example, only the selected document A-8, 220 of the active axis A, 205 is moveable using the keyboard's arrows, for instance in an embodiment, or by hand gesture in another embodiment directed to touch screen navigation. Thus the active document can change in accordance with the action of the user. In the present situation, if a user actuates the left arrow on the keyboard, the active document 220 will change to A-7 then A-6, A-5 and so on so forth till document A1 is active. If the user further move to the left then the focus of the display will change to see the next document to the left (A-0) that is not visible at the moment. The same mechanism works on the right side to see document A-9 for instance.

Information 225 related to the selected axis of documents A, 205 and/or the active document C-8, 222 is displayed on the header 230 located above 230 the group of axes 204. The following information can, inter alia, be displayed simultaneously or consecutively on the header 230:

Title of the selected axis of documents;
Number of documents on the axis of documents;
Title of the selected document;
Date of the selected document;
Number of the selected document among all documents in the axis of documents; and inter alia
Number of unread documents on the axis of documents.

The size, color, width and height of the header 230 can be modified without departing from the scope of the present invention.

Figure 5:
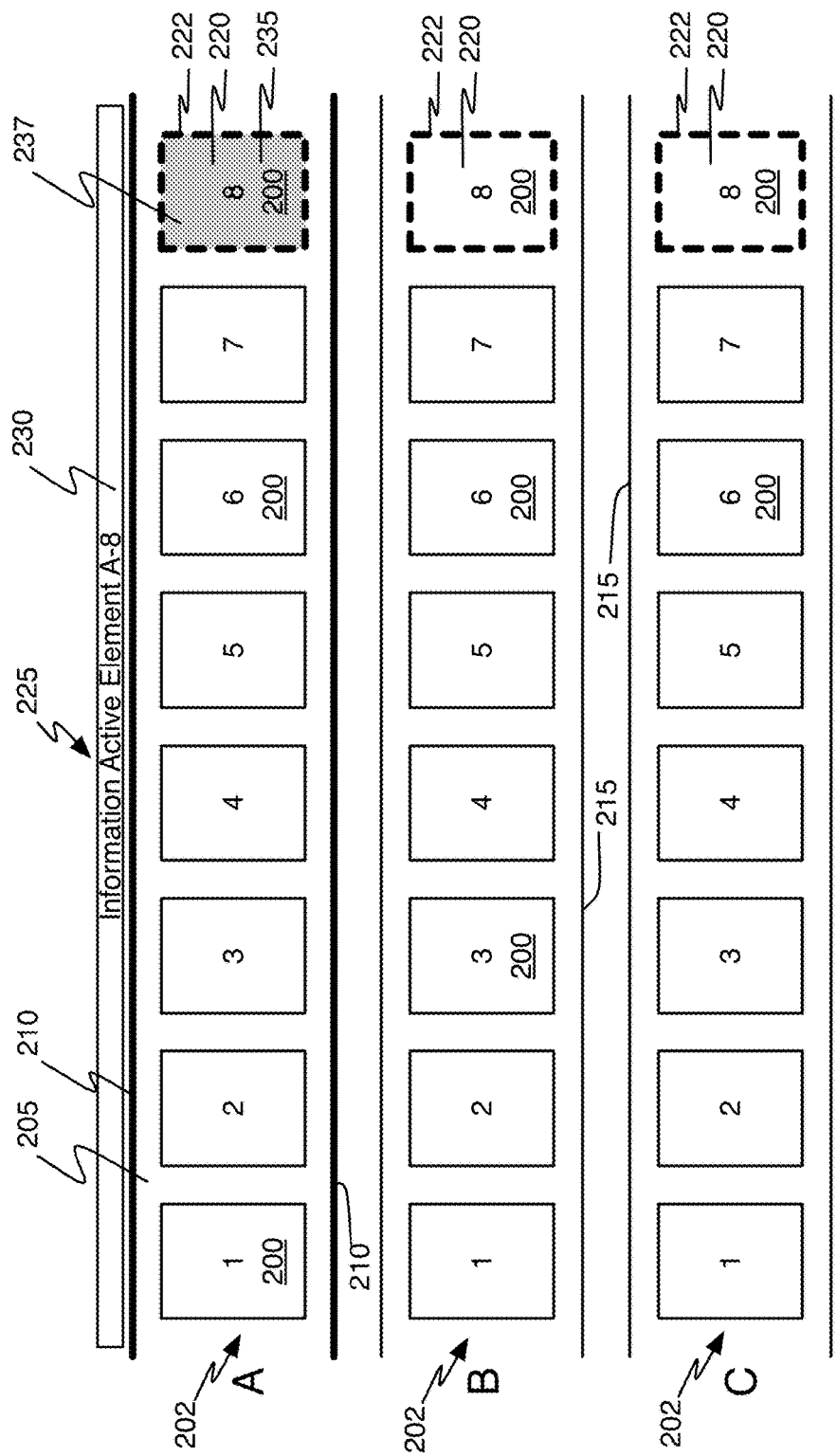
FIG. 5 is a schematic illustration of multiple axes of documents disposed in a longitudinal and parallel arrangement with active documents and a selected document therein in accordance with an exemplary embodiment of the present invention.

FIG. 5 illustrates a selected document 235 in addition to the active documents 222. The selected document 235 can be acted upon as opposed to the active document 222 that mainly identify the document on which visualization is directed. The selection 235 of a document 200 can be done to copy, cut and act upon the selected document 235.

Figure 6:
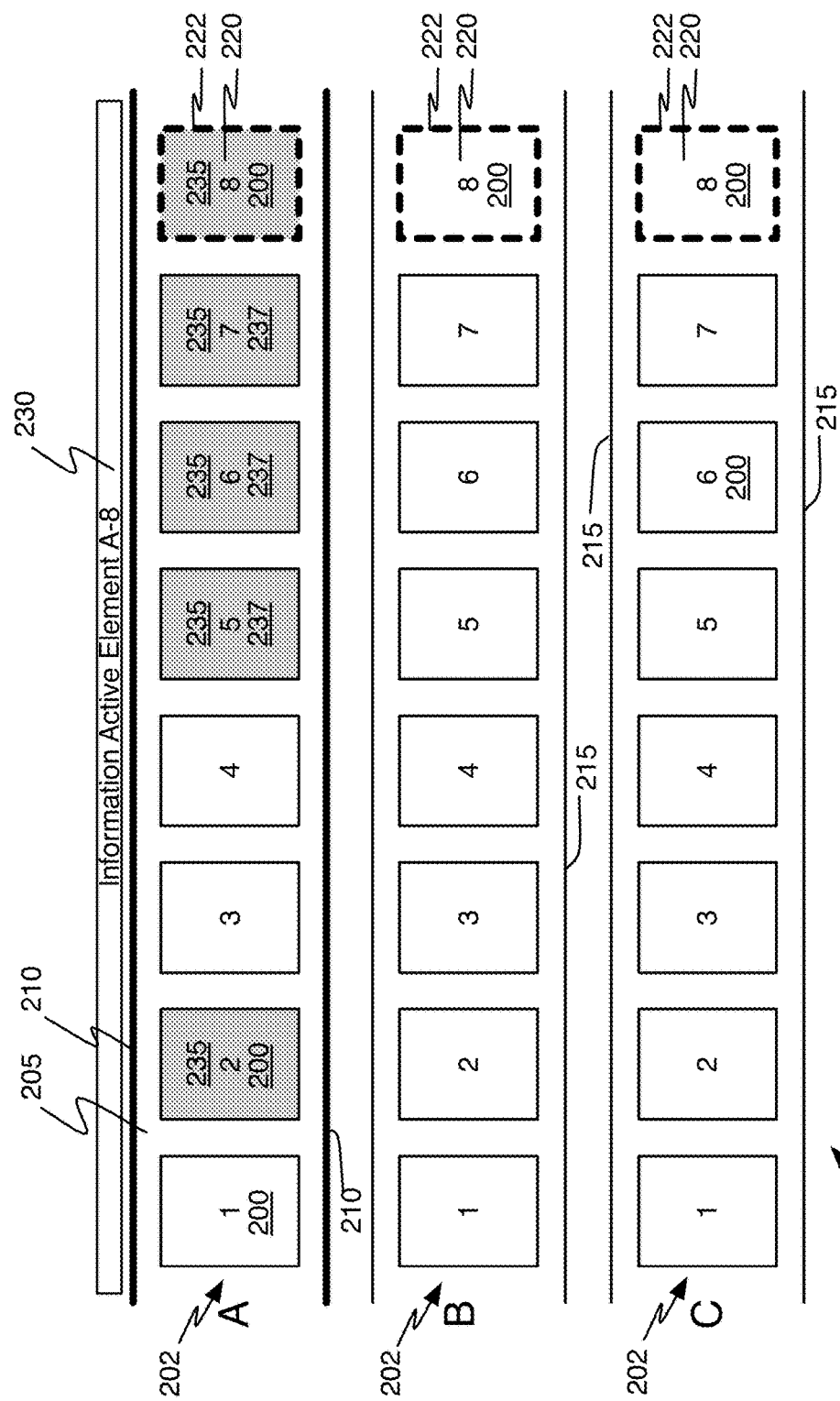
FIG. 6 is a schematic illustration of multiple axes of documents disposed in a longitudinal and parallel arrangement with active documents and selected documents therein in accordance with an exemplary embodiment of the present invention.

As illustrated in the embodiment illustrated in FIG. 6, one or many documents 200 can sequentially or collectively be selected 235 on an active axis of documents 205. The selection 235 can be made by pointing the desired document 200 with the pointing device (cursor not shown) and clicking on the document 200. A multiple selection of documents 235, 200 can be done by dragging an area over the axis 202 or by using the SHIFT or COMMAND key. Other means for selecting documents like a contact of a body part on a touch sensitive display or body movements in a sensing region of a multi-dimensional sensing device are encompassed by the present specification as well. In FIG. 6, document 200, A-2, A-5 through A-8, in axis of document 202, A, are selected and represented by a darker filling 237.

The selection of a document 200, with a pointing device or other means, of another will enable the lastly selected document as the active document 220. The active document 220 in the case of a multiple selection of documents 200 will be the lastly selected document 235, 200.

Figure 7:
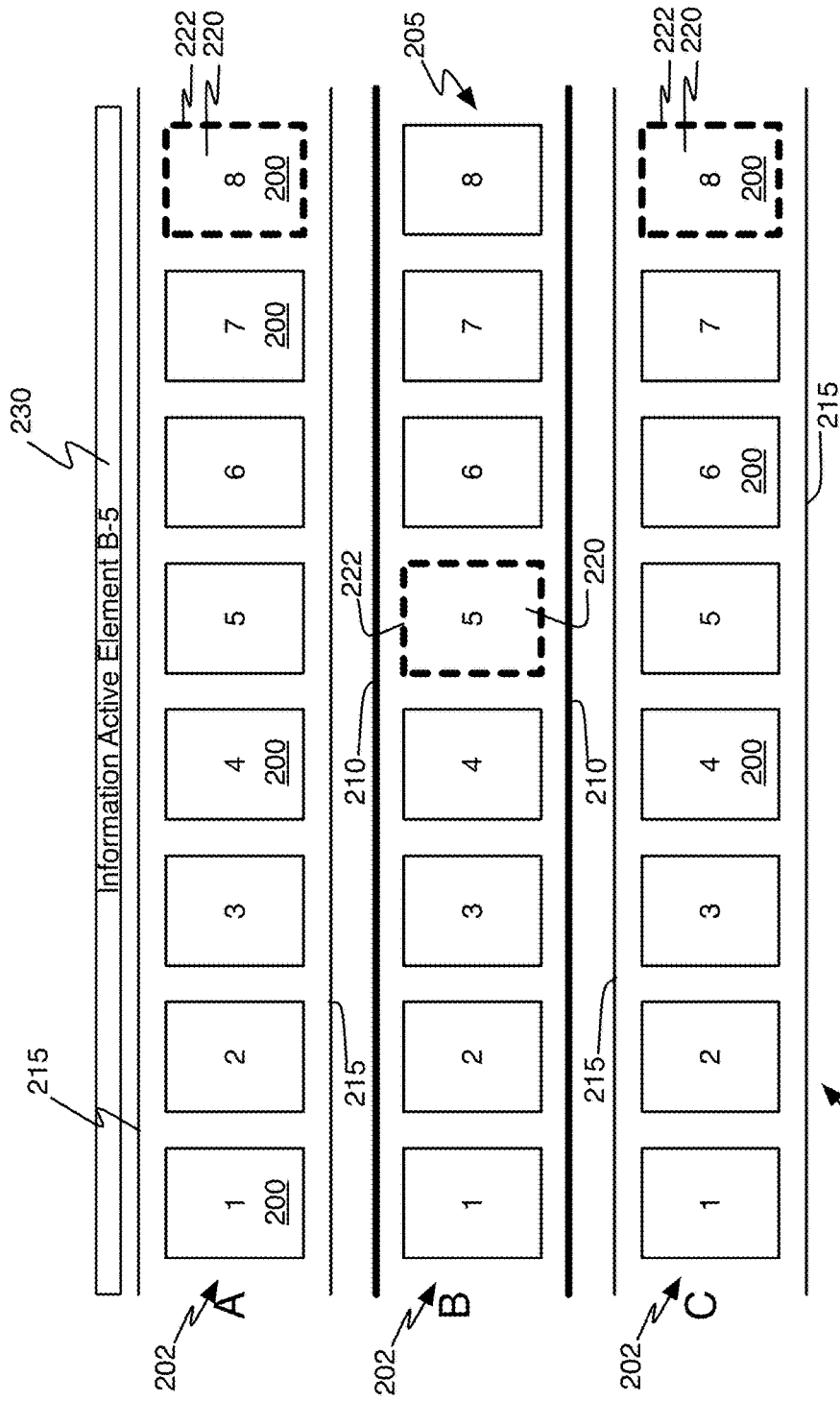
FIG. 7 is a schematic illustration of multiple axes of documents disposed in a longitudinal and parallel arrangement with active documents and a selected documents therein in accordance with an exemplary embodiment of the present invention.

Turning now to FIG. 7 where axis B is the active axis identified by bolder rails 210. In this example, document B-5 has been pointed by the user of the interface and is the active document 220. Meanwhile the active axis has changed to axis B since the last action has been made on axis B.

Figure 8:
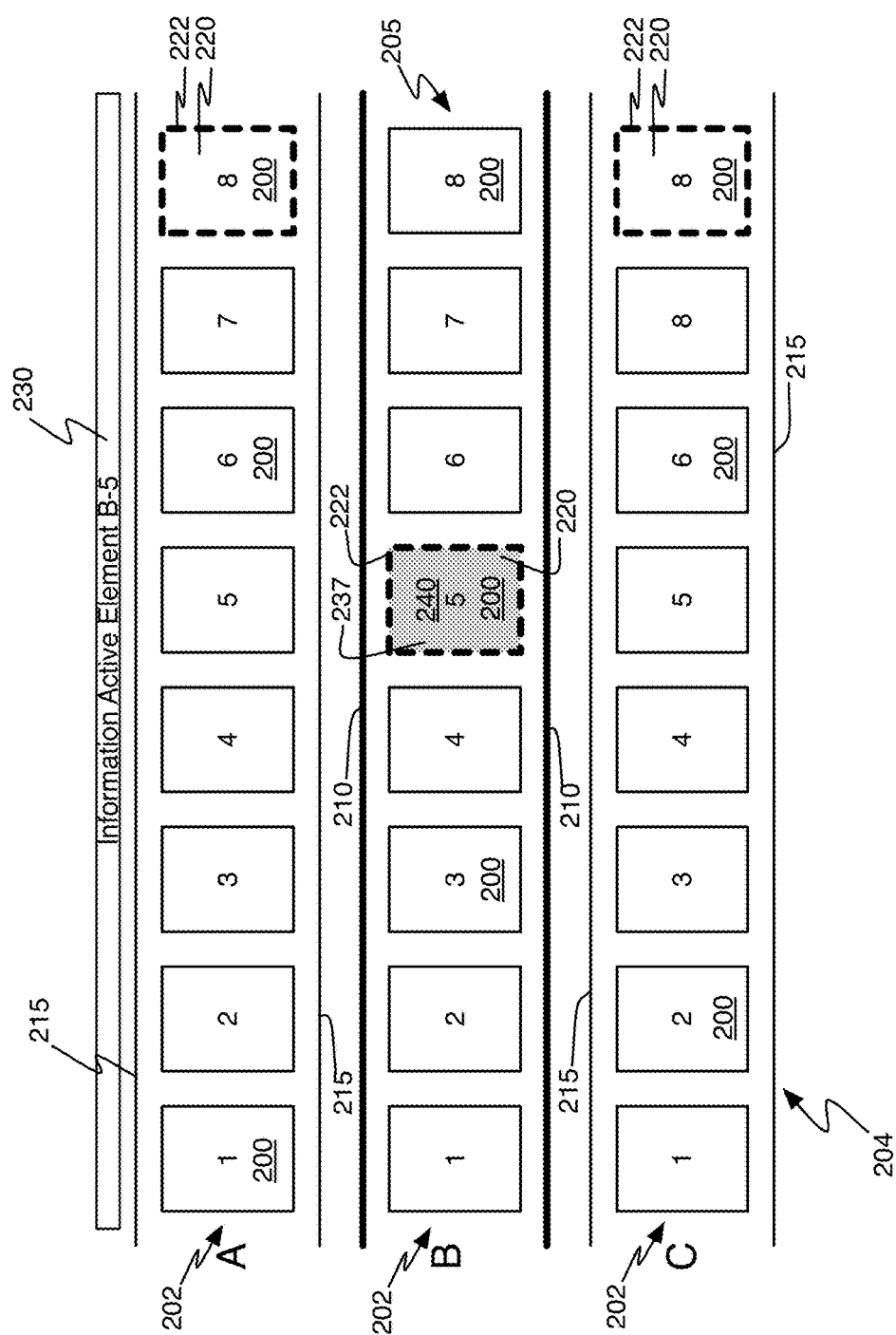
FIG. 8 is a schematic illustration of multiple axes of documents disposed in a longitudinal and parallel arrangement with active documents and a selected document therein in accordance with an exemplary embodiment of the present invention.

FIG. 8 illustrates the embodiments of FIG. 7 where the active document B-5, 220 is also a selected document 240 depicted with a darker more opaque filling.

Figure 9:
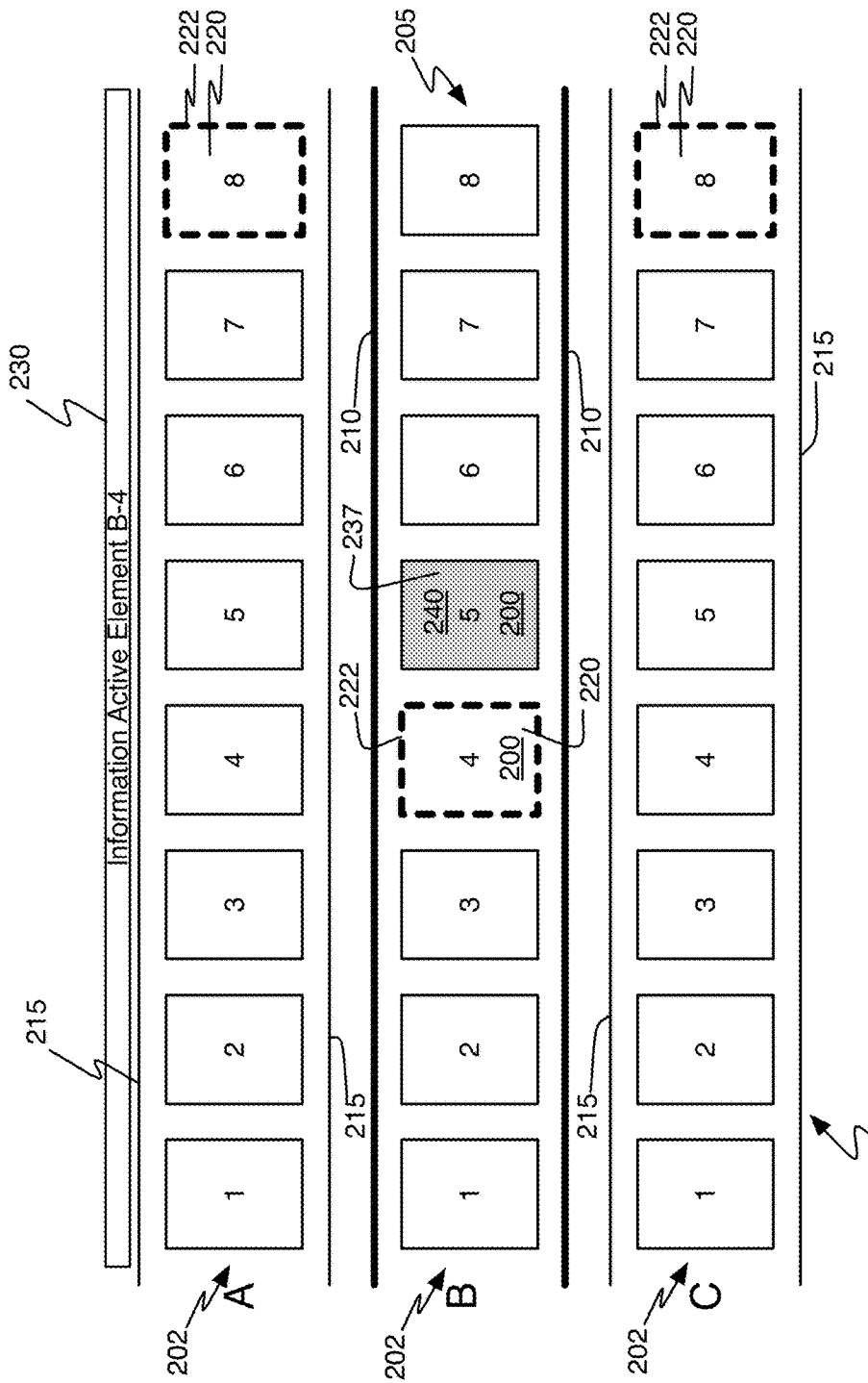
FIG. 9 is a schematic illustration of multiple axes of documents disposed in a longitudinal and parallel arrangement with active documents and a selected document therein in accordance with an exemplary embodiment of the present invention.

The active document 220 has moved to the left to document B-4 as opposed to document B-5 while document B-5 remains selected as illustrated in FIG. 9.

Figure 10:
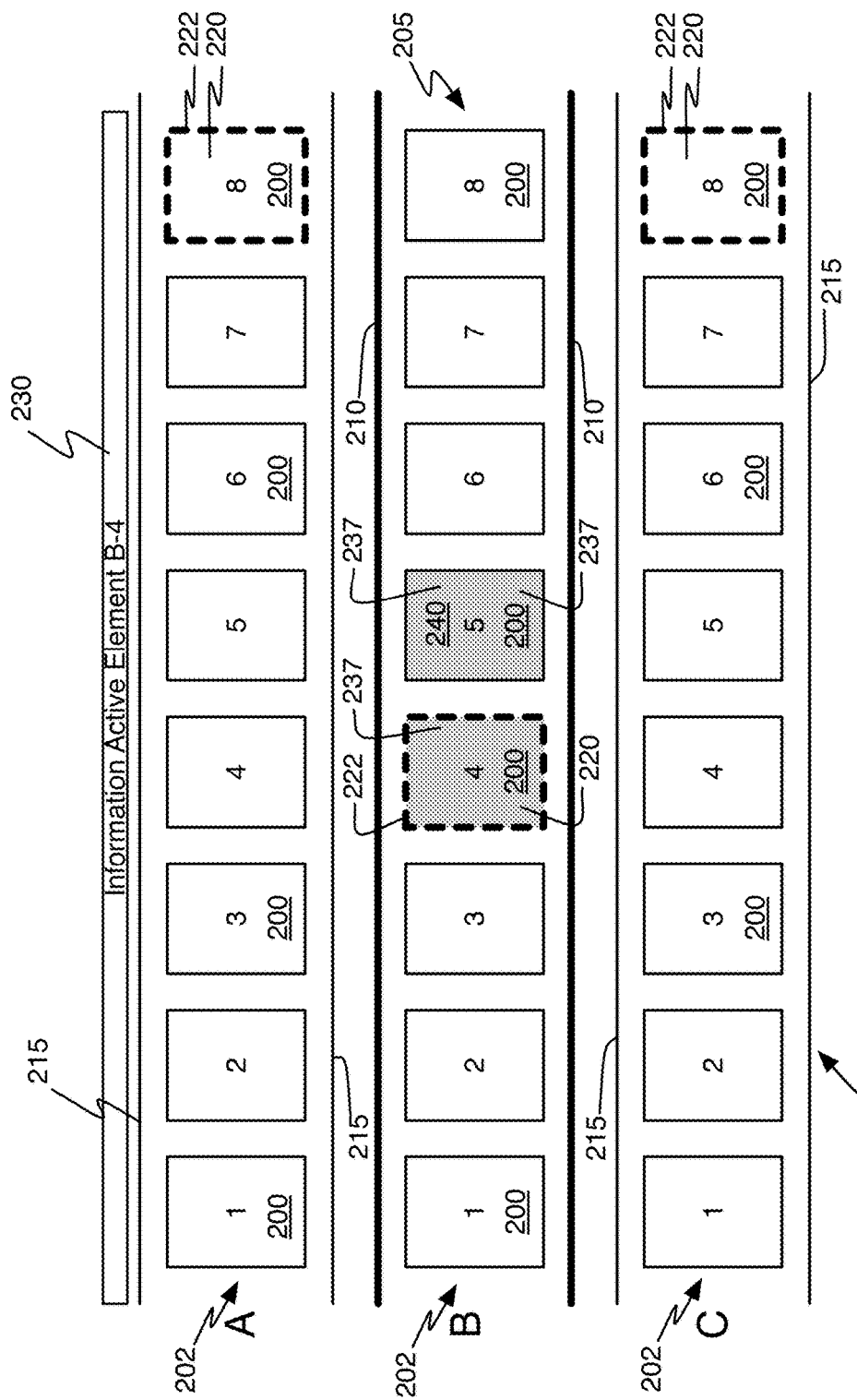
FIG. 10 is a schematic illustration of multiple axes of documents disposed in a longitudinal and parallel arrangement with active documents and a selected document therein in accordance with an exemplary embodiment of the present invention.

Holding down the COMMAND key (or a proper gesture) and selecting document B-4 it now shows in darker filling in FIG. 10 along with still selected document B-5.

Now, from the illustrative scenario of FIG. 10, document B-1 is selected holding the SHIFT key to select 240 in group documents B-3 to B-1.

Figure 11:
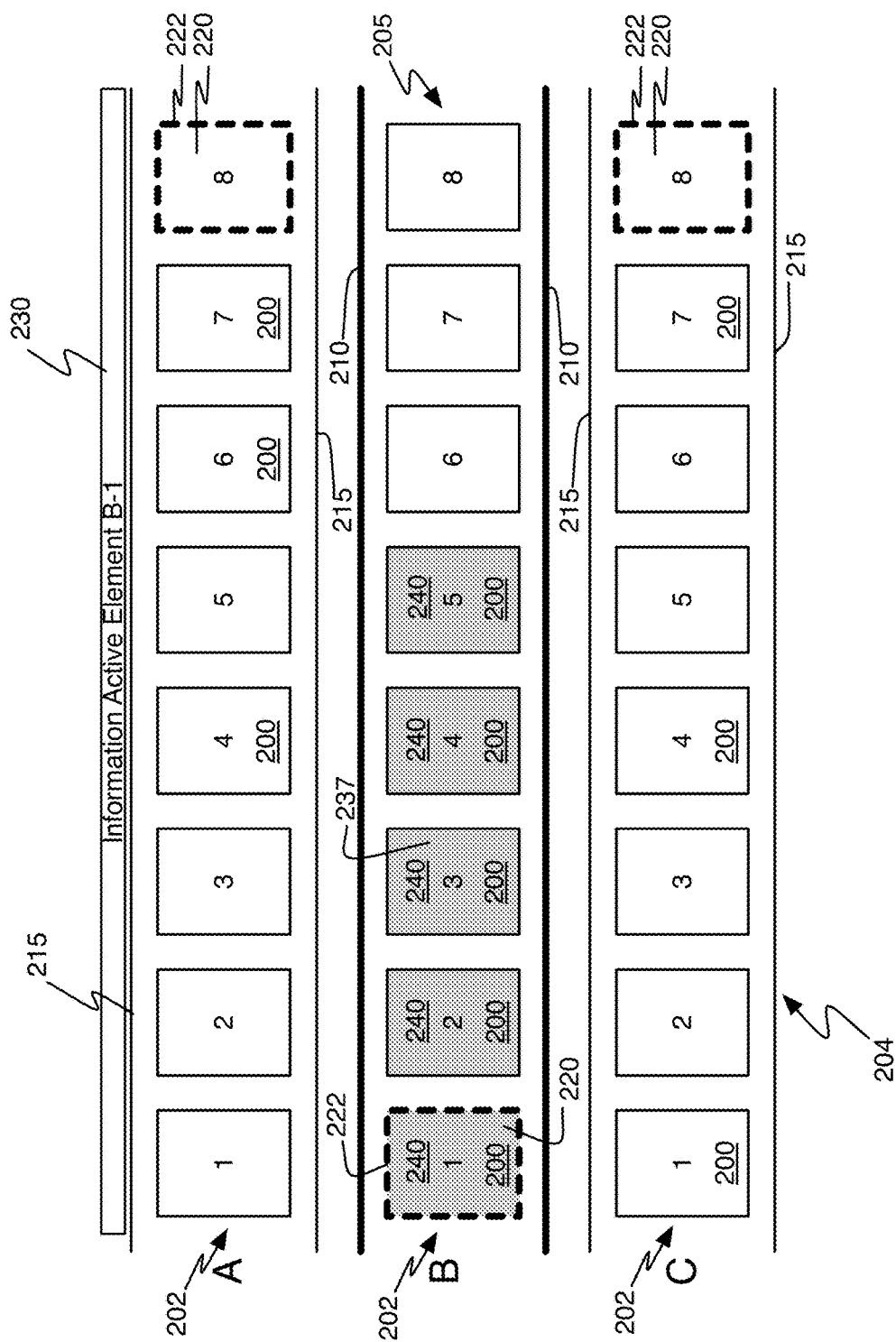
FIG. 11 is a schematic illustration of multiple axes of documents disposed in a longitudinal and parallel arrangement with active documents and a selected document therein in accordance with an exemplary embodiment of the present invention.
Figure 12:
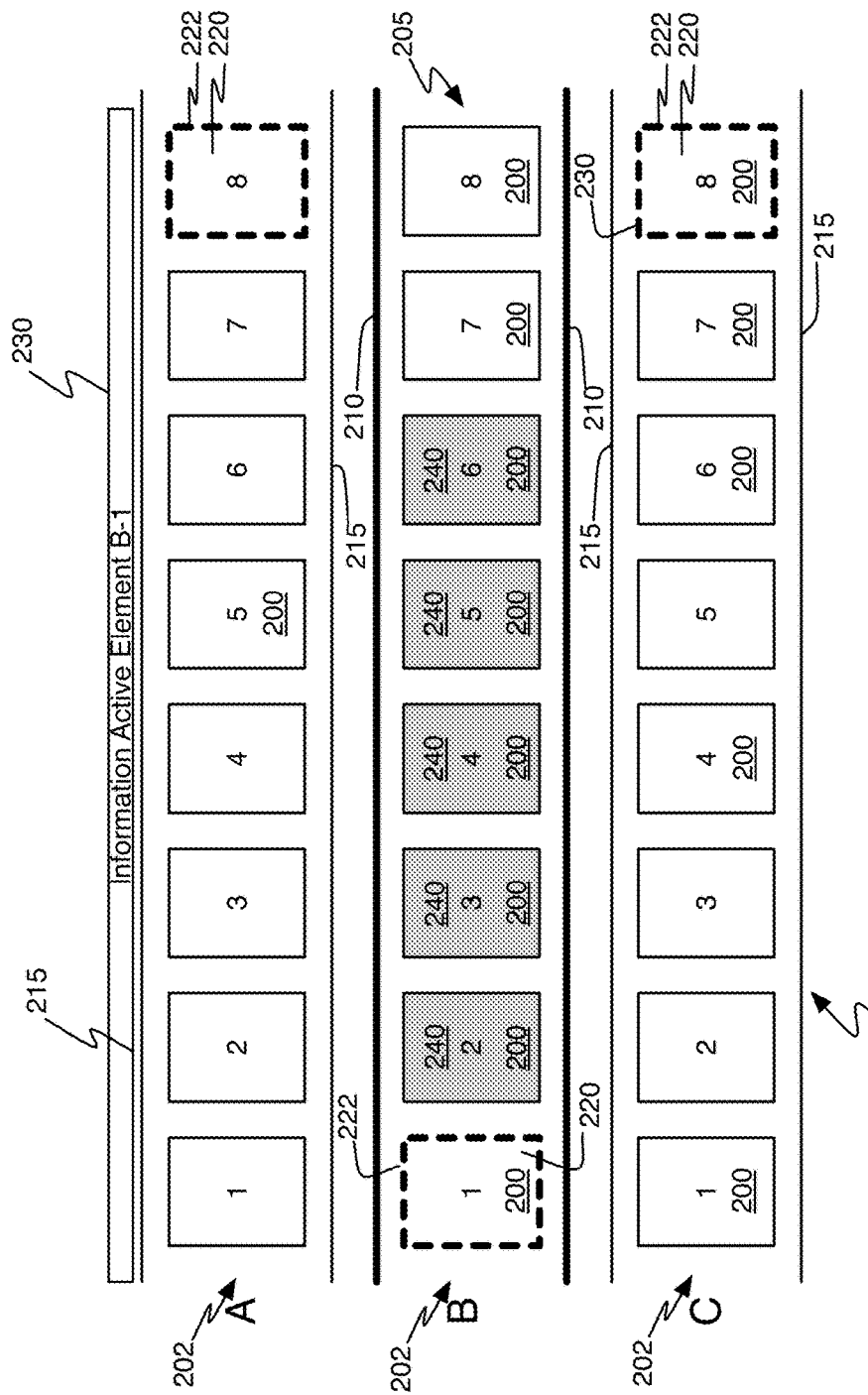
FIG. 12 is a schematic illustration of multiple axes of documents disposed in a longitudinal and parallel arrangement with active documents and a selected document therein in accordance with an exemplary embodiment of the present invention.

Still beginning with the illustrative scenario of FIG. 11, holding the COMMAND key, document B-1 is selected another time to deselect it as illustrated in FIG. 12 where document B-1 does not have a dark filling anymore.

Figure 13:
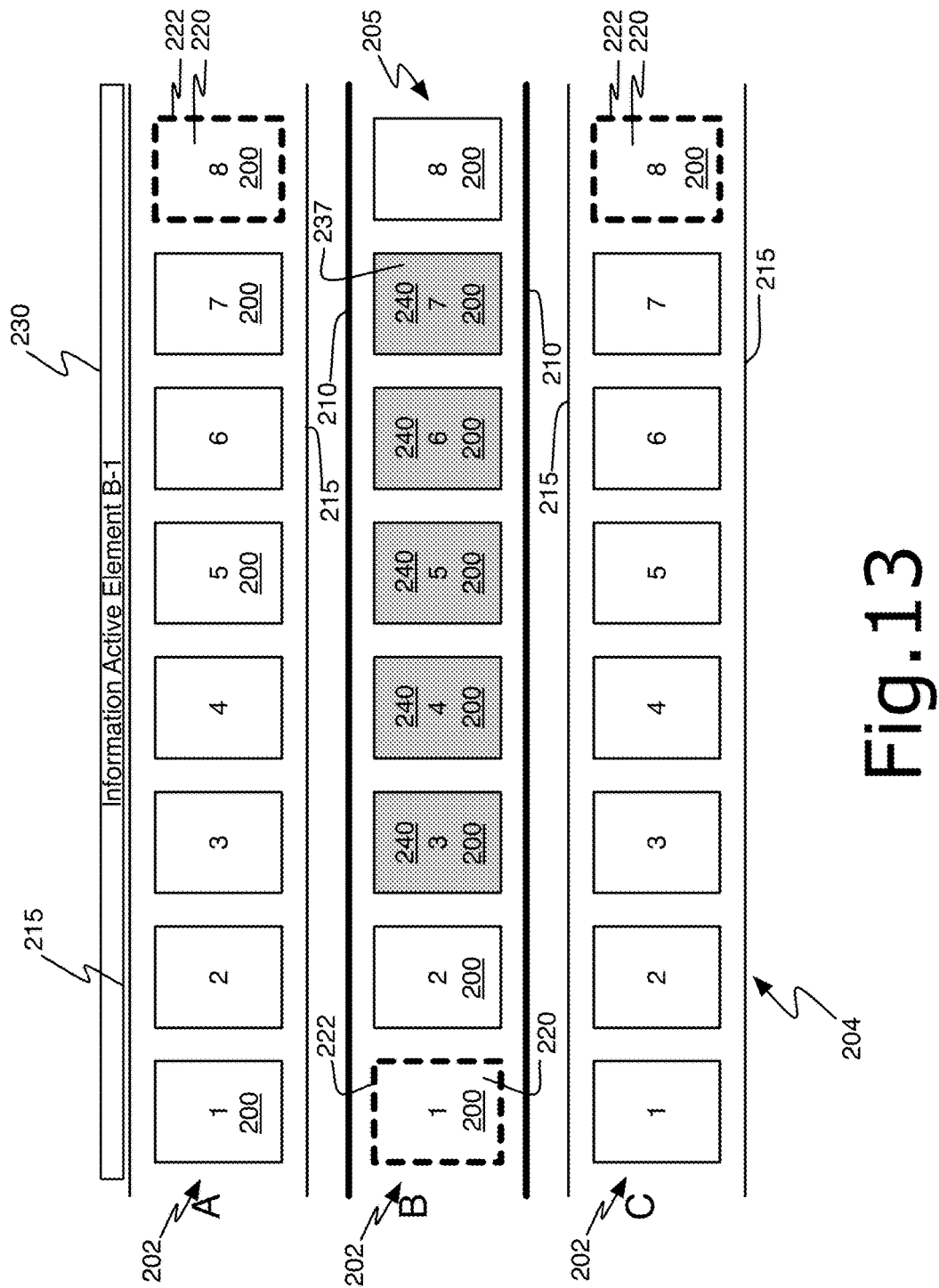
FIG. 13 is a schematic illustration of multiple axes of documents disposed in a longitudinal and parallel arrangement with active documents and a selected document therein in accordance with an exemplary embodiment of the present invention.

Again, another example beginning with the illustrative scenario of FIG. 12, holding the COMMAND key, document B-7 is selected to select it as illustrated in FIG. 13 where document B-7 have a dark filling. Additionally, in a second action, holding the COMMAND key, document B-2 is selected to deselect it as illustrated in FIG. 13 where document B-2 does not have a dark filling 237 anymore. The left arrow key has pressed to move the active document 220 to document B-1.

Figure 14:
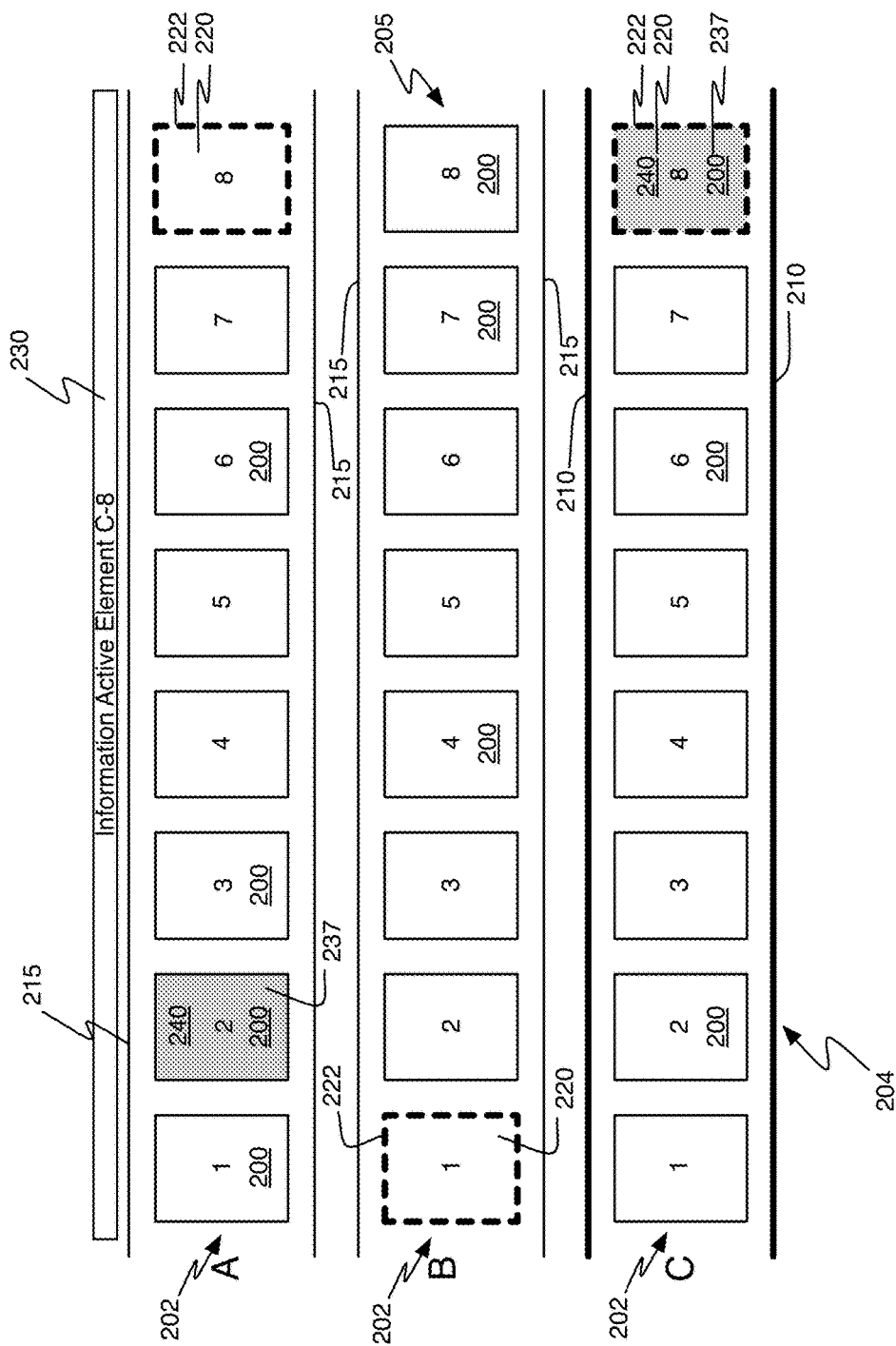
FIG. 14 is a schematic illustration of multiple axes of documents disposed in a longitudinal and parallel arrangement with active documents and a selected document therein in accordance with an exemplary embodiment of the present invention.

Turning now to FIG. 14 where documents B-3 through B-7 have been unselected either by selecting independently a second time each of the documents 200 or by collectively deselecting documents B-3 and B-7 holding the SHIFT key. Then document A-2 has been selected, the active document of axis A has been moved with the arrow key to move it to document A-8. Then document C-8 has been selected, and shows in darker filling, and becomes the active element 220. Axis C also becomes the active axis at the same time.

Combining keyboard keys may be used in order to navigate and select element. These keys may vary for specific need or may depend on the Operating System platform of the user. Combining arrow key with several modifier keys, such as ALT or CONTROL, the user may navigate from a time unit to another. Using multiple modifiers like SHIFT with ALT or CONTROL with arrow key, the user may make a selection or expand current selection from the active element to the next or previous time unit. Using Page Up and Page Down, the user may navigate from a screen, display or windows, to another. Using Page Up and Page Down with SHIFT may create a selection or expand the current selection from the active element to the next or previous screen, display or windows. Using Home and End keys, the user may navigate to the start or the end of the axis of document. Using Page Up and Page Down with SHIFT may create a selection or expand the current selection from the active element to start or the end of the axis of document.

Figure 15:
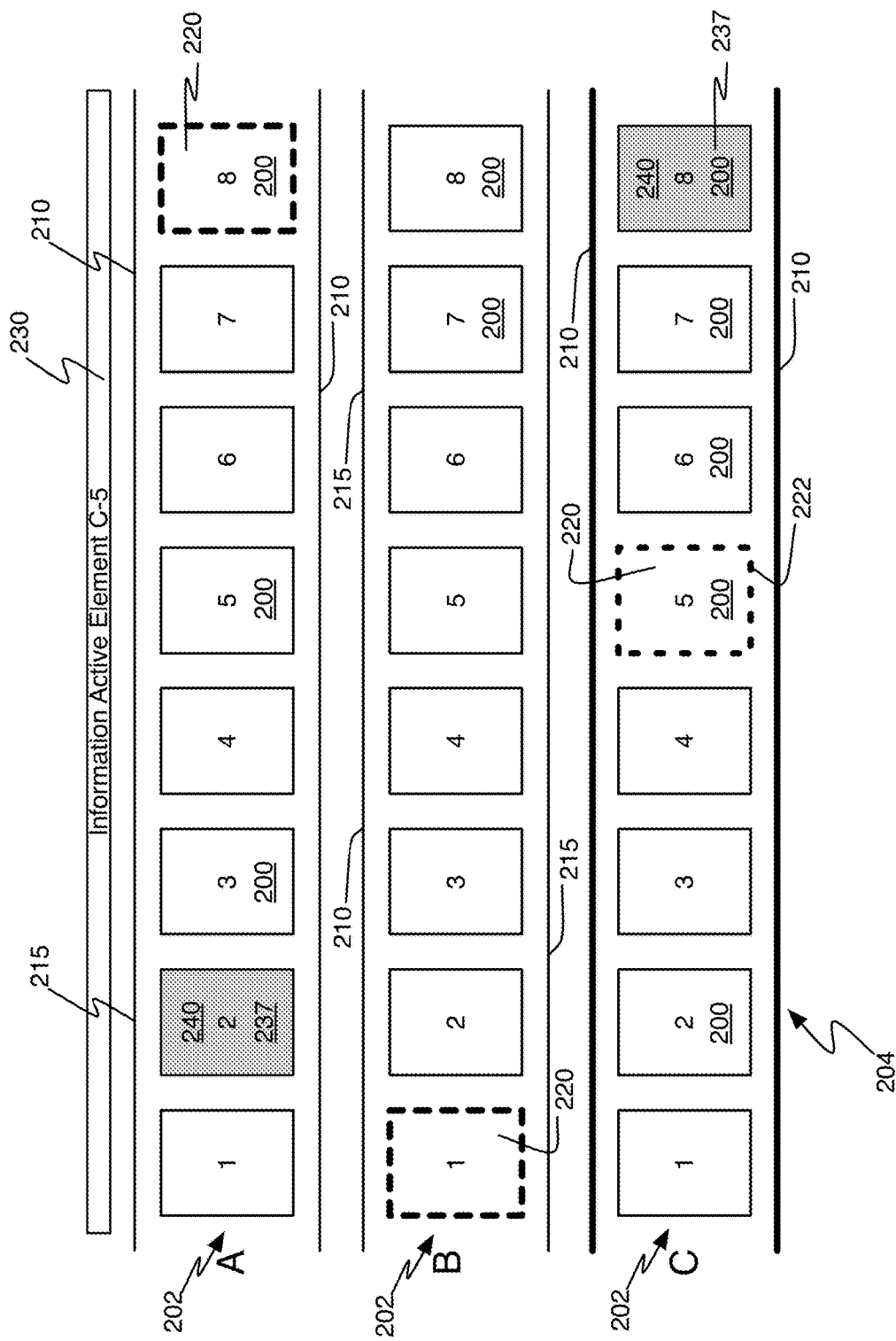
FIG. 15 is a schematic illustration of multiple axes of documents disposed in a longitudinal and parallel arrangement with active documents and a selected document therein in accordance with an exemplary embodiment of the present invention.

On FIG. 15, the scenario of FIG. 14 is copied although the active document in axis C has been moved to document B-5, 220 with the arrow key from the keyboard.

Figure 16:
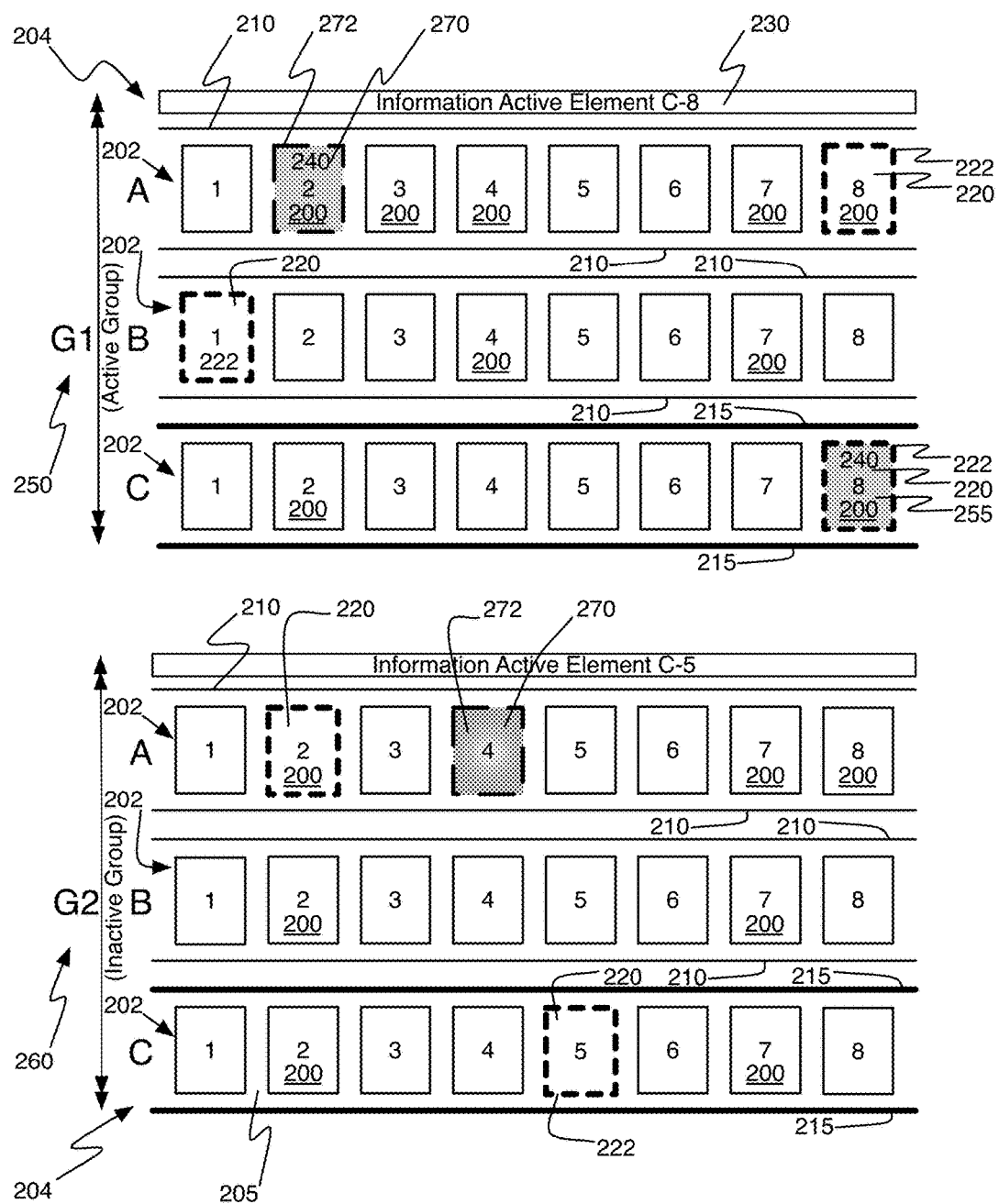
FIG. 16 is a schematic illustration of multiple axes of documents separated in two groups of axes of documents and disposed in a longitudinal and parallel arrangement with active documents and selected documents therein in accordance with an exemplary embodiment of the present invention.

FIG. 16 illustrates two distinct groups of axes of documents 250, 260. The first group 250 illustratively comprises three axes of documents A, B and C. The second group of documents 260 also illustratively, but non-restrictively, comprises three axes of documents A, B and C. The first group of axes 250 is active as opposed to the second inactive group of axes 260 that is inactive. The active axis of documents 250 is active because document 255 is the active document of the active axis C. Should another document of the same axis A or another axis B or C of group A be the active document, group A would still be the active group of axes.

The inactive group of axes of documents 260 also has a plurality of axes of documents, a latent active axis of documents C and latent inactive axes of documents A and B. We consider latent axes of documents because they have a particular state in an inactive group of axes 260—that is illustrated in a lighter color thereof to ensure sufficient discrepancy with the active group of axes of documents 250.

Still referring to FIG. 16, document 270 in group 250, illustrated with visually distinct border 272, is also present in group of axes 260. Document 270 is repeated in axis A as document A-4 with similar border 272. This is an example of correlation among various axes of documents 200 located in different groups of axes of documents 200 to provide insight to a user as to what documents are found in more that one axis of documents (that might represent various queries or other grouping of documents 200). A border or a frame can illustrate repetition of a document 200. In one embodiment of the present invention, the sole repetition of a document is enough to visually illustrate the repetition. The visual distinctive feature used to visually discriminate the repeated documents 200 can also represent a repeated document in the case the repeated document is an active document 220 or a selected document 240.

In embodiments of the present specification is presented selected and non-selected axes of documents. At least one axis from a plurality of axes can be selected to apply actions thereon. It is therefore possible to perform operations on axes that is going to effect, in at least one embodiment, the documents contained therein. A selected axis is going to be graphically discriminated from the other axes by, for example, a bolder border 215.

Figure 17:
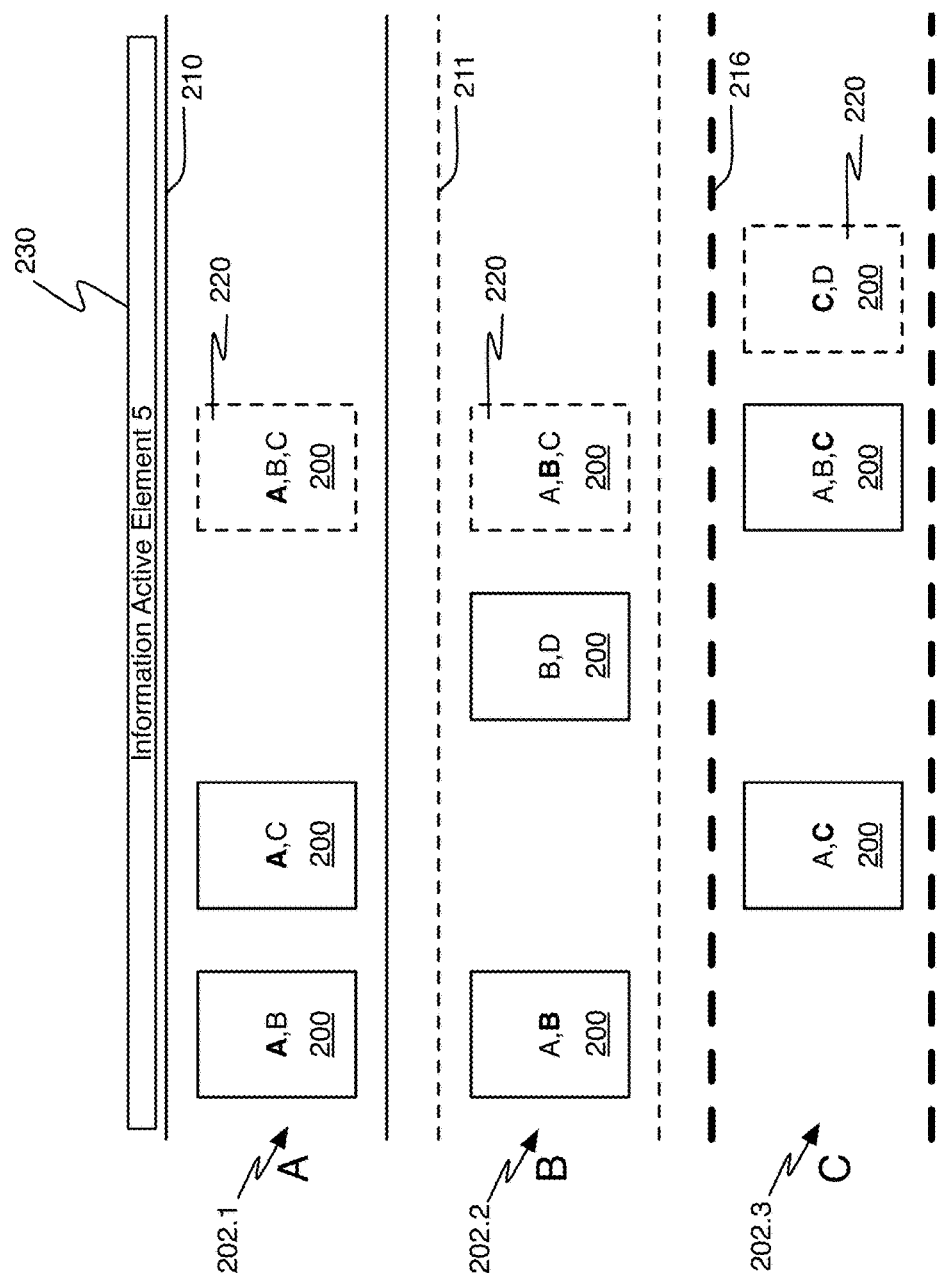
FIG. 17 is a schematic illustration of multiple axes of documents disposed in a longitudinal and parallel arrangement with particular documents alignment in accordance with an exemplary embodiment of the present invention.

In the present embodiment of the invention, axes of documents may be considered as active and/or selected. FIG. 17 depicts a plurality of axes of documents with different border rails styles. The thin full line 210 indicates the user that the axis of documents is neither active nor selected. The thin dotted line 211 indicates the user that the axis of document is selected but not active. The thick dotted line 216 indicates the user that the axis of document is selected and active. A thick full line 215 (not shown in FIG. 17) would represent an active but not selected axis of documents. Other styles or colors may be applied or add more variation for further semantic needs. In the preferred embodiment, the user is constraint to have only one active axis of documents at a time in one axes of the document's environment, but it may be possible to have multiple active axes at a time for particular needs.

Selection of a plurality of axes of documents gives possibility to the user of doing operations to all the selection, such as changing properties to a common value, joining axes of document in a group, etc.

Figure 18:
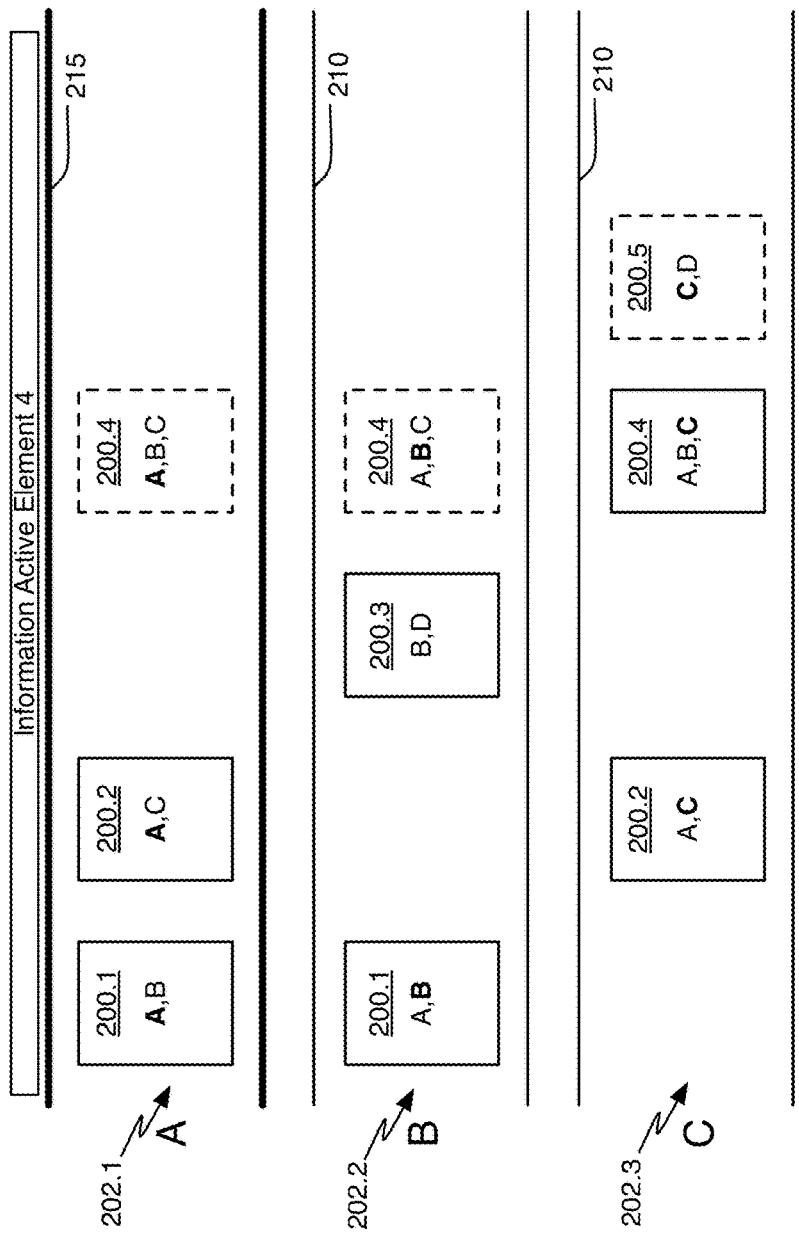
FIG. 18 is a schematic illustration of multiple axes of documents disposed in a longitudinal and parallel arrangement with particular documents alignment in accordance with an exemplary embodiment of the present invention.

FIG. 18 is an illustrative representation of a plurality of axes of document with a filter on an attribute. In the illustrative example, the axes of documents 202.1, 202.2 and 202.3 shows only documents that have respectively attribute A, B and C defined. Some documents may be shown in multiple axes of documents since they have attributes that satisfy many filters. In the illustrative example, these instances 200.1, 200.2 and 200.4 are aligned horizontally to help the user see the common results.

Figure 19:
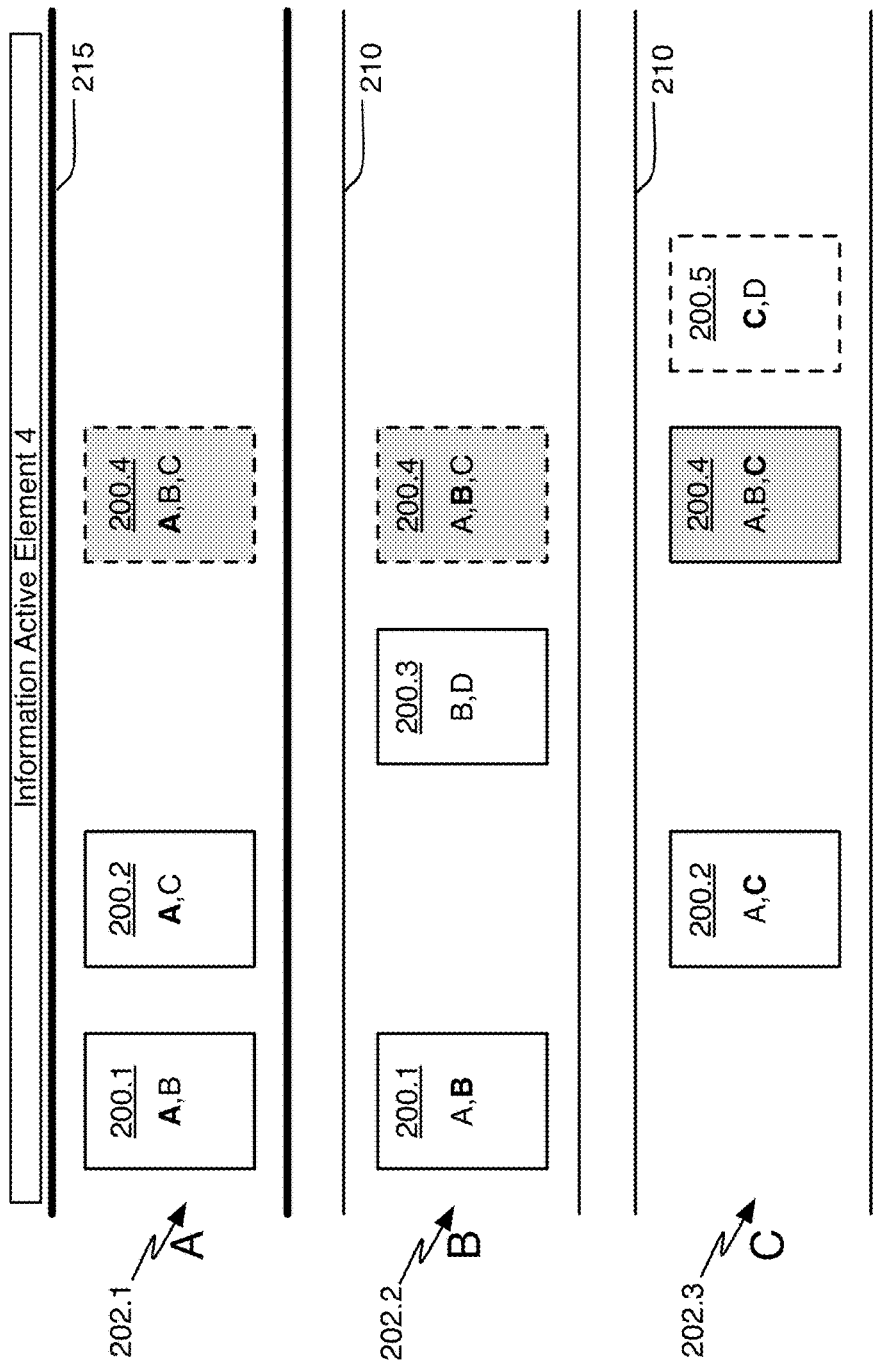
FIG. 19 is a schematic illustration of multiple axes of documents disposed in a longitudinal and parallel arrangement with particular documents alignment in accordance with an exemplary embodiment of the present invention.

One embodiment of the present invention is to consider selected documents in a plurality of documents as a common selection of document. When a document is selected, all shared instance in all axes of documents should be marked as selected as well. FIG. 19 shows how the user select the document 200.4 in axis 202.1 was selected and how all instance of 200.4 in other axes of documents were selected as well.

Figure 20:
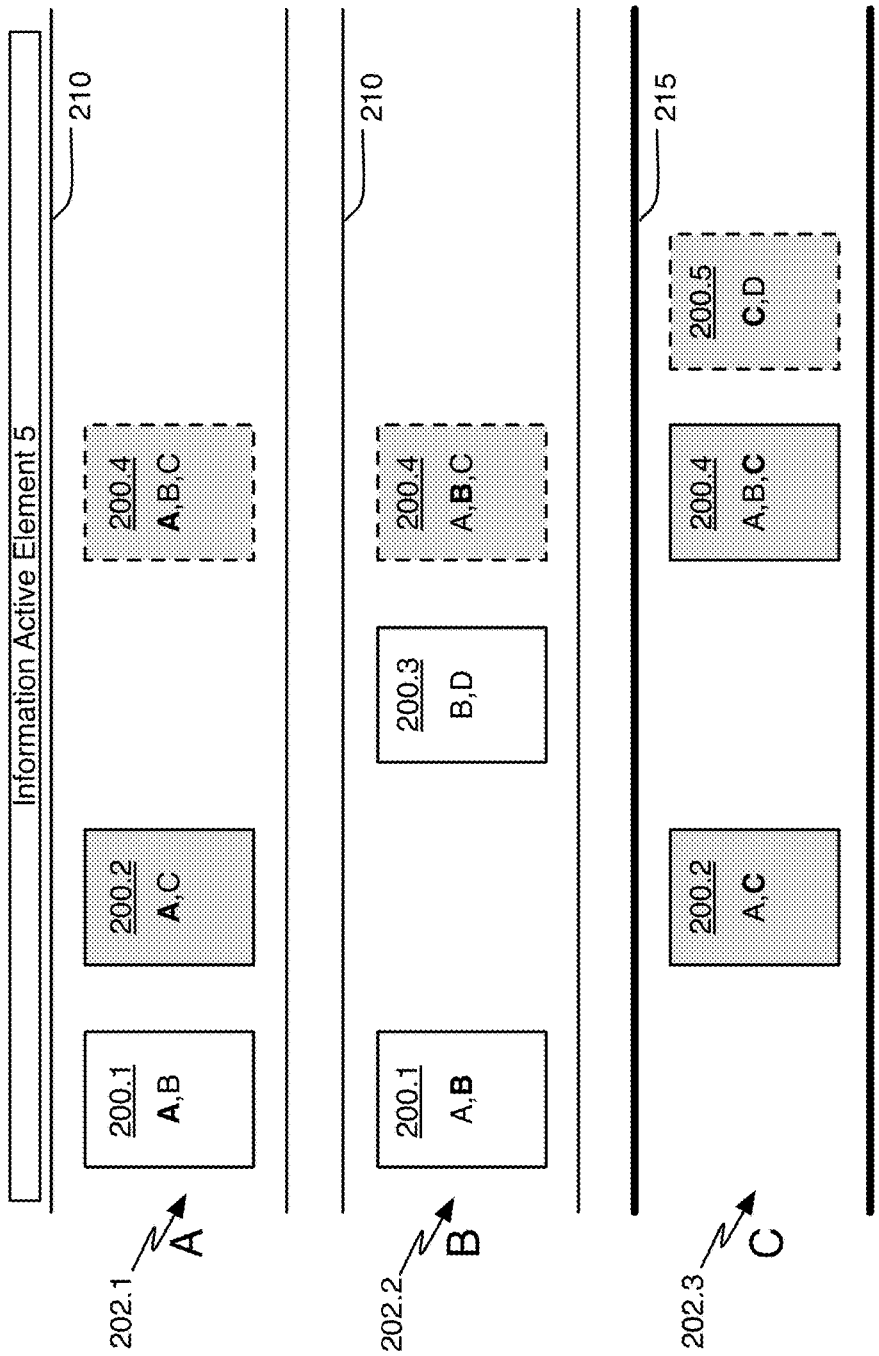
FIG. 20 is a schematic illustration of multiple axes of documents disposed in a longitudinal and parallel arrangement with particular documents alignment in accordance with an exemplary embodiment of the present invention.

The user interface may gives user several menu commands or keyboard shortcuts to do operation on active or selected axes of documents. In the illustrative example FIG. 20, the user made the axis of document 202.3 active then use a "select all" operation on this axis of document. One can appreciate that shared selection also affected the document 200.2 in axis 202.1.

Figure 21:
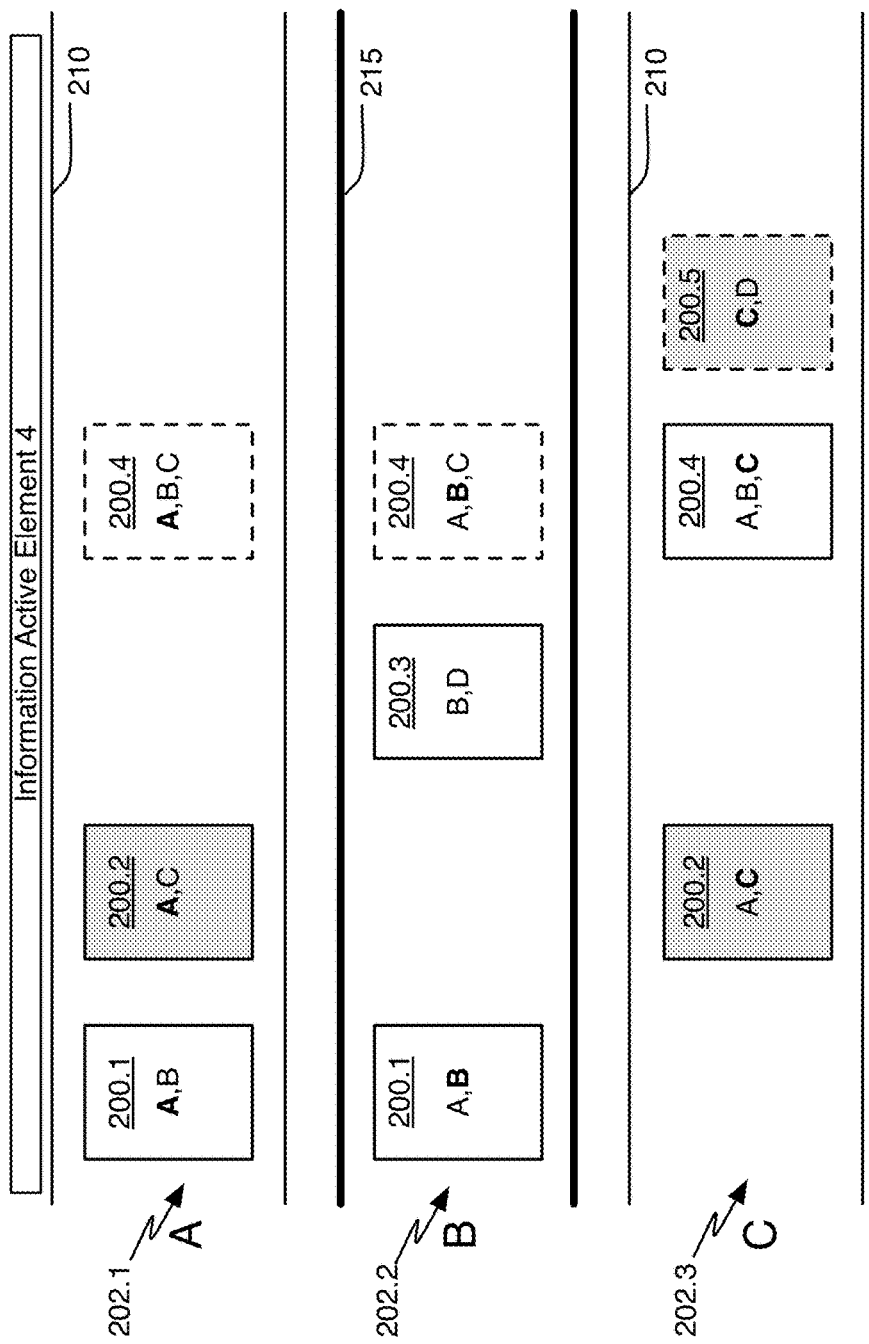
FIG. 21 is a schematic illustration of multiple axes of documents disposed in a longitudinal and parallel arrangement with particular documents alignment in accordance with an exemplary embodiment of the present invention.

FIG. 21 illustrate a similar behaviour where the user made the axis of document 202.2 active, and then a "unselect all" operation was triggered. The document 200.1 was already unselected and stay still while document 200.4 is unselected. In the illustrative example how all instances of document 200.4 got unselected in other axes of document 202.1 and 202.3. Documents 200.2 and 200.5 remains selected since they were not modified by the last operation.

Figure 22:
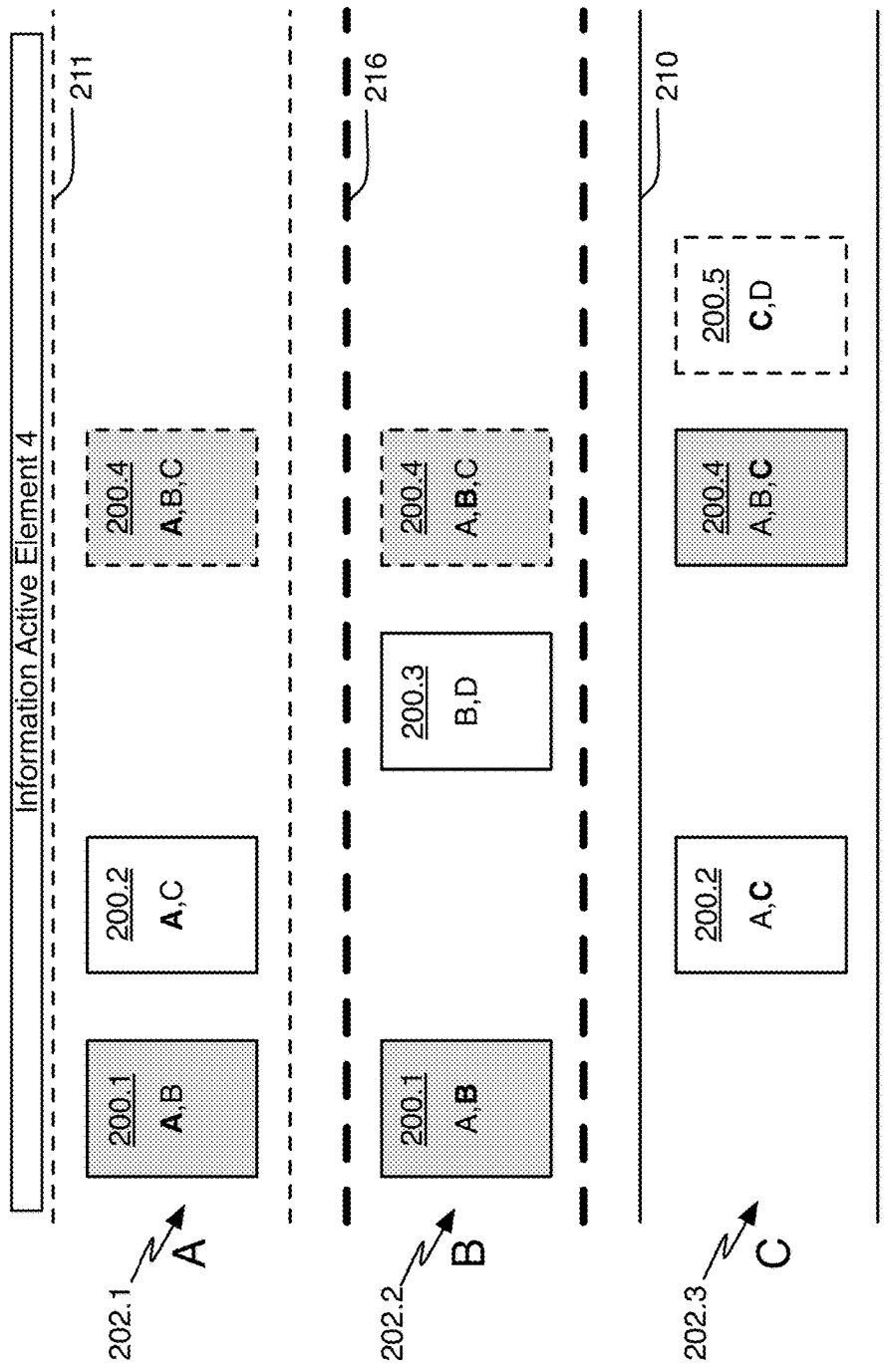
FIG. 22 is a schematic illustration of multiple axes of documents disposed in a longitudinal and parallel arrangement with particular documents alignment in accordance with an exemplary embodiment of the present invention.

One can appreciate the way the Set union operation can be easily made with these axes of documents. Selection of axes of documents can be use to made other Set operations. FIG. 22 shows the result of an intersection operation. The user made a selection on axes of documents 202.1 and 202.2 and triggers an intersection operation on selected axes of documents. Commons documents of all selected axes of documents, such a 200.1 and 200.4 get selected while others 200.1, 200.2 and 200.5 gets unselected. Different behaviour may be defined to make a union between the last state of the selection and the current result of the intersection. In this case, 200.2 and 200.5 would have remained selected.

All these user activities may be describe as a succession of mathematical Set operation. By example, user operations illustrated on FIGS. 18-22 can be described like:

"(((is document 200.4) UNION (has attribute C)) MINUS (has attribute B)) UNION ((has attribute A) INTERSECTION (has attribute B))"

The user may use this selection to create a new axis of document with selected documents only. This new axis of document may use this Set description to create a Boolean predicative condition over documents.

One embodiment of the present invention is that the user may have the choice to have a static or dynamic document selection. These two modes affect documents that are added, modified or removed live. These events may happen because another process or other users over a network, by example, access the documents that are currently shown in axis of documents.

Static selection is a conservative way to react to these events. Added document are not added to selection, modified document stay in selection and removed documents are removed from selection. This is the default selection behaviour in most applications as it is the most predictable system, but lacks power.

Dynamic selection is an operation-based selection. Using the Set operation made from select all, unselect all, intersection and other Set operations on selection, the document events stay consistent with this operation. Added documents get selected if they respect the selection operation scheme, modified documents get selected or unselected if they respect or not the selection operation scheme. Finally, the removed documents get removed from selection.

Figure 23:
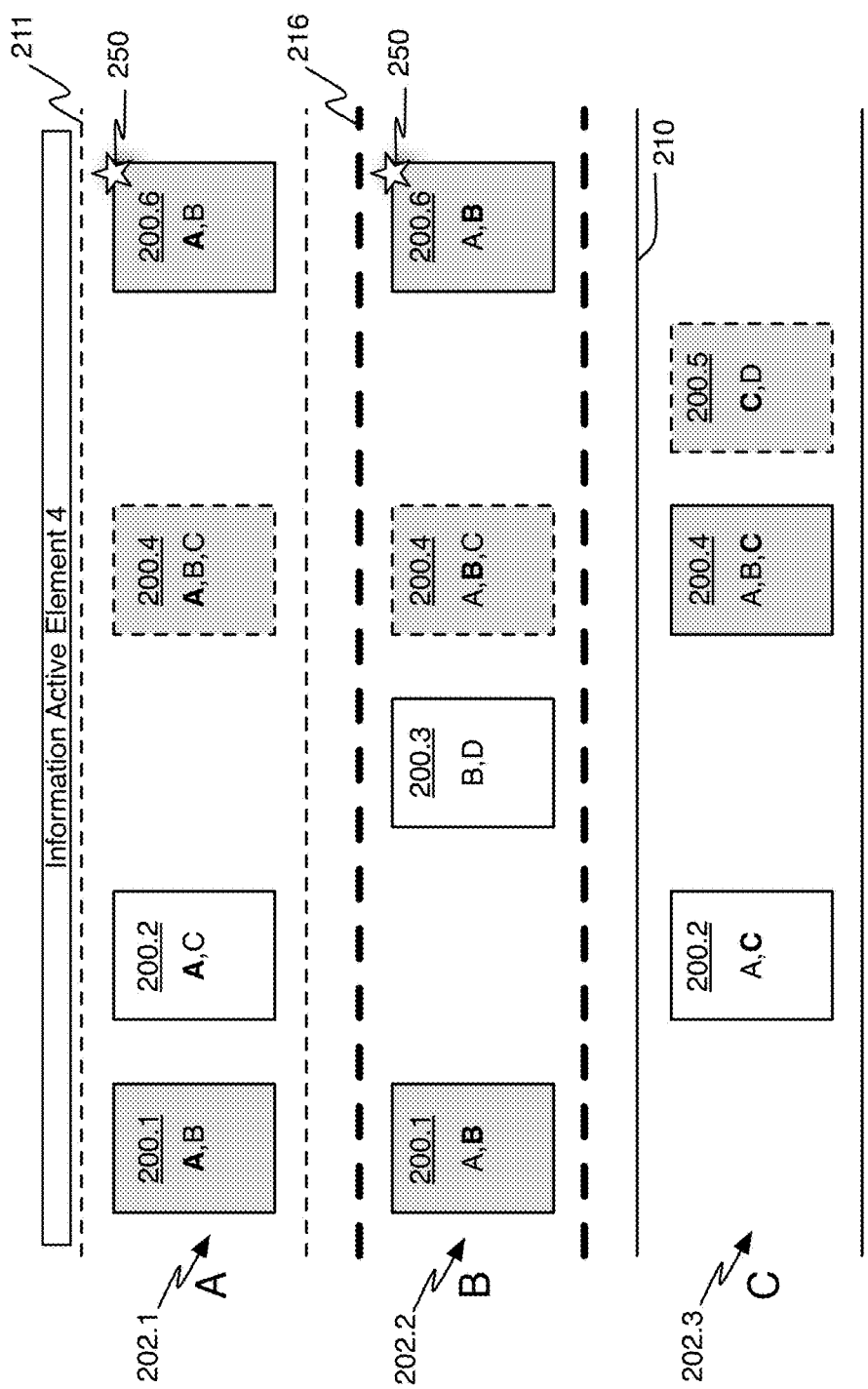
FIG. 23 is a schematic illustration of multiple axes of documents disposed in a longitudinal and parallel arrangement with identifications thereon in accordance with an exemplary embodiment of the present invention.

FIG. 23 shows how a newly created document 200.6 appears in axes 202.1 and 202.2 since it have the attributes A and B. A visual distinctive feature 250 may be shown to indicate the user that this document is new and have been added to the axis of document. The document gets automatically selected with the dynamic selection system, since it is a result of the intersection between axis of document 202.1 and 202.2.

Figure 24:
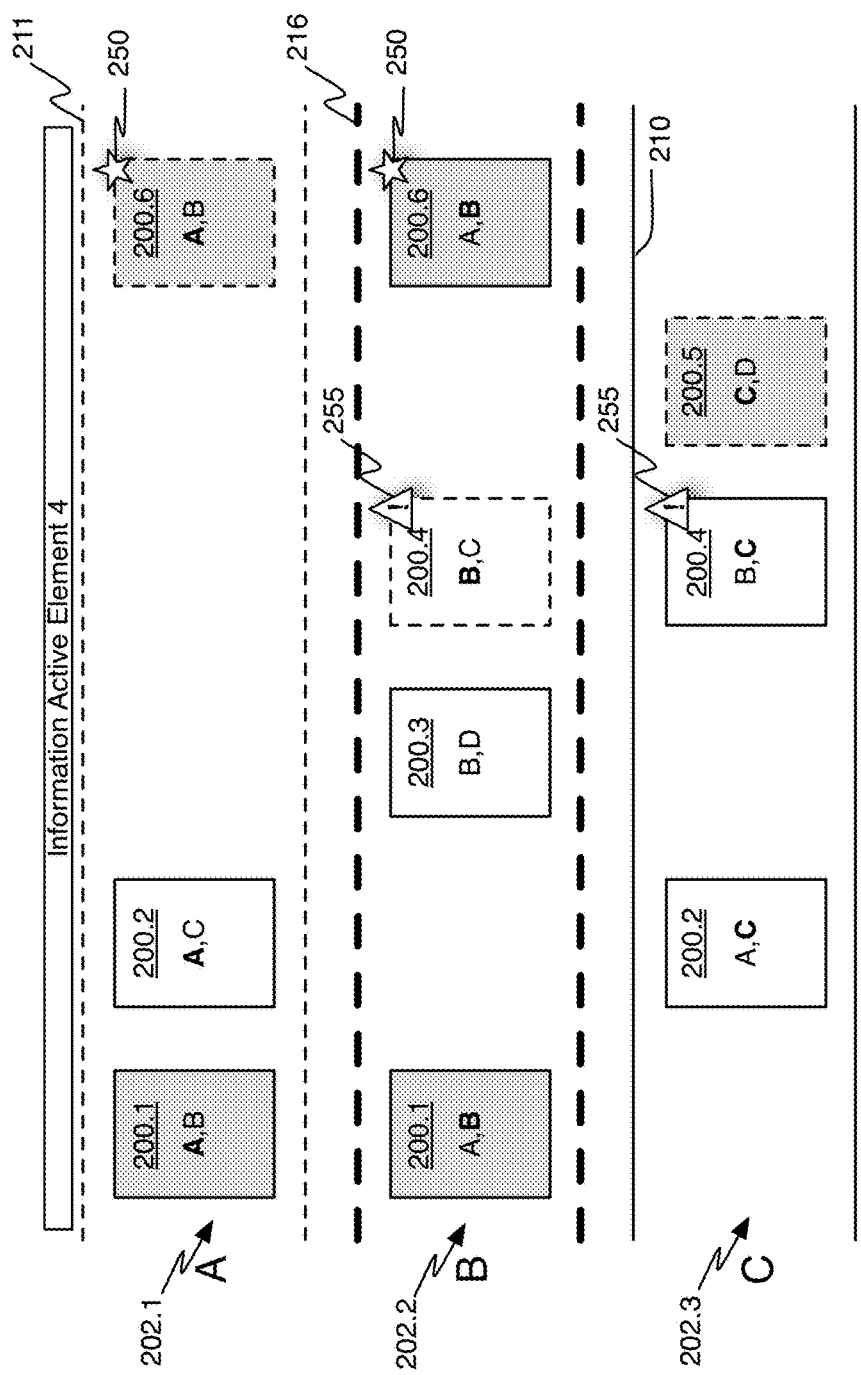
FIG. 24 is a schematic illustration of multiple axes of documents disposed in a longitudinal and parallel arrangement with identifications thereon in accordance with an exemplary embodiment of the present invention.

FIG. 24 shows how the modified document 200.4 gets modified. A visual distinctive feature 255 may be shown to indicate the user that the document gets modified. The document 200.4 gets its attribute A removed, so it is no longer a member of axis of document 202.1. Since the selection is dynamic, the document 200.1 is not part of the intersection of axes of documents 202.1 and 202.2 anymore, so the document 200.4 gets unselected in all axis of documents it appears.

This strategy of dynamic selection may be used in large database results where the client application may truncate the axis of document for bandwidth, speed or memory optimization. As the user navigates in the large axis of document, parts of it may be loaded (and other parts unloaded) by the system. In this situation, when a user made a Set operation, such as a "select all", "unselect all", unions, intersections, differences, the server could compute a Boolean operation from this succession of Set operation and makes change happen on the server-side when the user choose to do an operation on the list of documents selected. It frees the client application of determining the complete list of selected documents and communicates the server the succession of Set operation or its Boolean equivalent formula instead of the complete list of selected documents.

Another embodiment of this invention is to gives the possibility to the user to maintain a plurality of selected documents Sets. The interface may show only one selection at a time and give the user a possibility to switch from a selection Set to another, create a virgin selection and delete a selection. The interface may also show multiple selections at the same time by using different color or patterns over the selected documents of the different Sets. Finally, these distinct Sets may be used to create a new Set by using Set operation over other Sets, such as union, intersection, difference, etc. This gives the possibility to the user to construct complex Sets selection operations.

The selection Set operations can be saved, loaded, used to create new axis of document of the selection, used the condition to create visual distinctive features, create permissions rules, etc.

Figure 25:
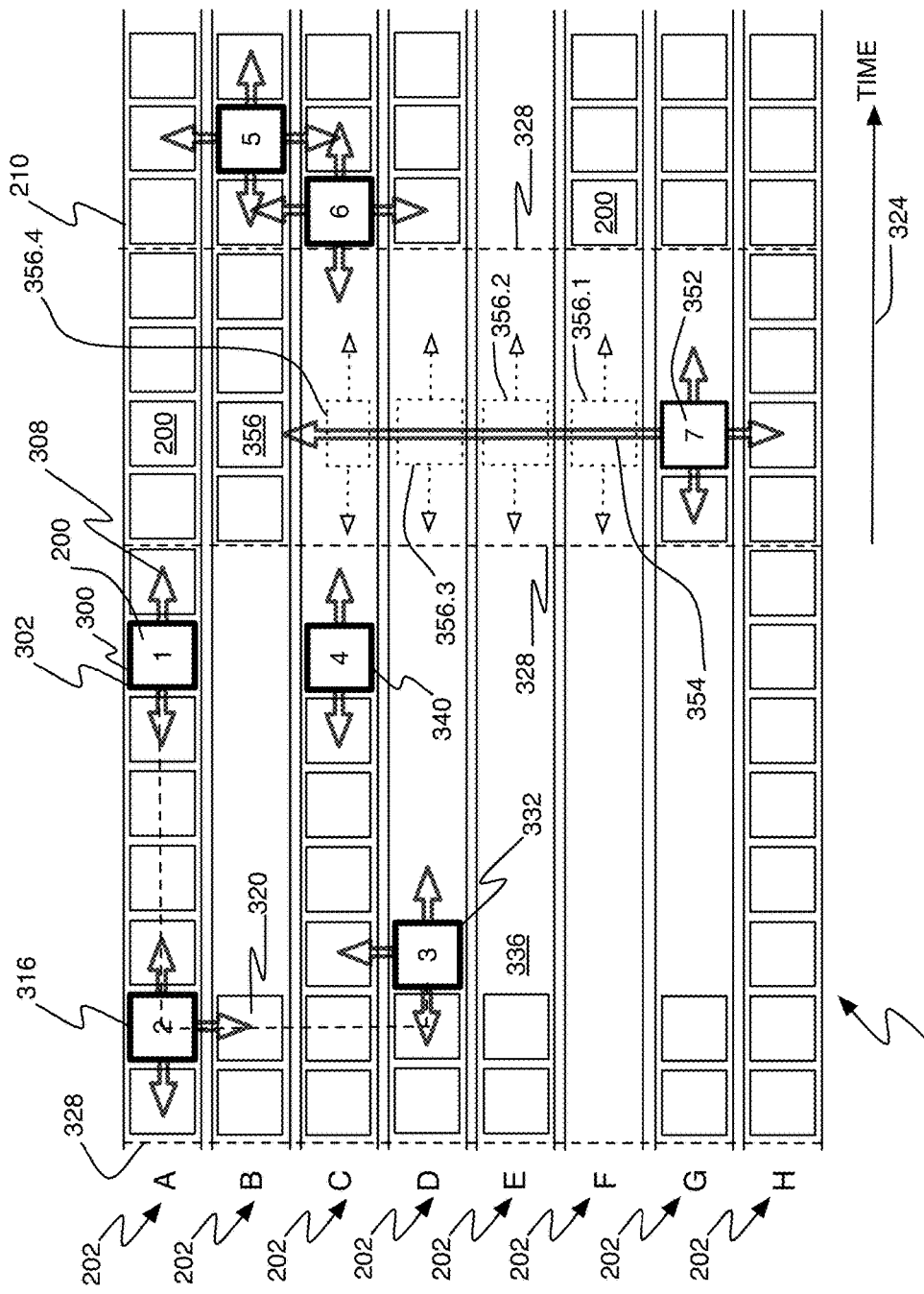
FIG. 25 is a schematic illustration of multiple axes of documents disposed in a longitudinal and parallel arrangement with active documents thereon in accordance with an exemplary embodiment of the present invention.

Turning now to FIG. 25 illustrating where is depicted another embodiment of the invention directed to navigation among documents 200 in axes 202 of documents and groups 204 of axes of documents.

In FIG. 25, active document 300, on axis A 202, illustrated with a bold frame 302, is adapted to sequentially move the activation of an adjacent document to the left 304, or to the right 308, to move the selection of the active document to another document 200. One can appreciate that the actual document does not move and it is the activation of the document that is enabled. Navigation from an active document to a document makes it active in an embodiment. The active document preferably automatically changes by the sole movement of the selection thereof. For example, an active document can be magnified in a separate window to appreciate more details thereof. Changing of active document is going to change the document that is magnified in the separate window. Navigation with an active document among the documents is going to sequentially magnify the documents 200 that are going to be active at some point during the navigation.

Returning back to active document 300, no movement of the active document is possible above because there is no more axes 202 above of axis A 202. No movement is possible below because there is no adjacent document 200 directly below document 300 on axis B 202 at location 312. The same dynamic is applied to document 316 where a downward movement is possible toward document 320 because document 320 is adjacent to document 316. One can appreciate that in the embodiment illustrated in FIG. 25, the documents 200 are vertically and horizontally aligned in a matrix type of configuration. This alignment is desirable because each axis 202 assembles documents pertaining to a same commonality while the vertical alignment is possible because the same timeline 324 is shared by all the axes 202 of the group of axes 204 formed thereby and separated with separators 328. In the present situation, the separators are separating time in days while other embodiments could separate the longitudinal axes in accordance with another criterion without departing from the scope of the present invention.

Still referring to FIG. 25, is illustrated document 332 that can provide therefrom three navigation directions, up, left and right. Movement downward is not allowed because there is no document 200 at location 336 in axis E 202. Document 344 has similar navigation possibilities while document 348 can navigate toward all four directions because it is bordered by documents 200 in all the four orthogonal directions. Alternatively, and that embodiment is not illustrated in the Figures, navigation could be made at an angle from a document when there are documents in that direction.

Another embodiment illustrated in FIG. 25 provides navigation capability among documents 200 on an axis even if there are no documents 200 immediately next to the subject document. In the present situation document 340 can move to the left and to the right to directly reach document 344. In this embodiment, no movement is allowed to another axis 202 because there are no documents immediately adjacent to document 340 on another adjacent axis B, D, 202.

Document 352 illustrates another embodiment that allows navigation to another axis 202 of documents despite there is no adjacent document on the adjacent axis of document 202. This "jump" 354 to the next available document 356 can be based on a preselected option or by being actuated by a specific action like, for instance, a double-click of the arrow pointing above on the keyboard, of the like.

Another embodiment is illustrated in FIG. 25. Document 352 does not have access to juxtaposed documents in axes 202, F, E, D and C to reach document 356 in axis B. A previous embodiment described a "jump" 354 to the next available document 356. This embodiment allows "ghost" documents 356 allowing a sequential navigation between axes 202 when no document exists to support the actual navigation using activation of the documents as previously describe above. The "ghost" document 356 identifies the virtual position of what would be an active document, even if there are no document, to allow sequential navigation to axes from where a longitudinal navigation can begin to reach the next document available on the subject axis. For example, active document 352 would allow a jump 354 to axis B. In this circumstances there is not possible to stop to another intervening axis 202 to further navigate thereon. The present embodiment would provide intervening steps on intervening axes C, D, E and F, herein referred to as "ghost" documents 356, activating no document thereof, because there is no document aligned with document 352, while allowing axial navigation on axis F, to the right, from ghost document 356.1. Moving up with another ghost document 356.2 that would allow navigation to the left. Then ghost document 356.3 allowing navigation to the left and the right. After, if moved toward axis C, ghost document 356.4 allows also navigation on both axial sides and finally reaching document 356 from which navigation therefrom has been explained above.

Figure 26:
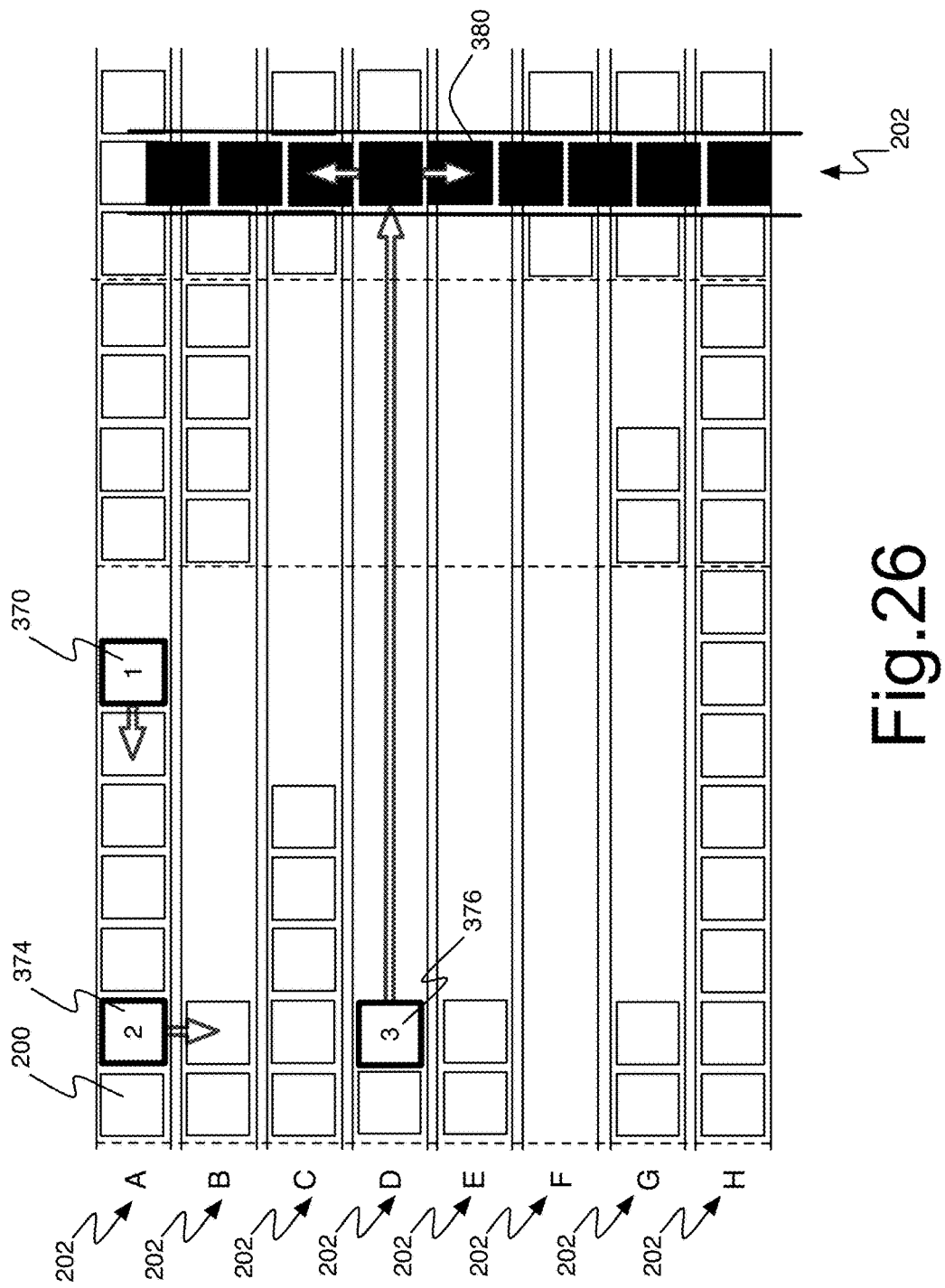
FIG. 26 is a schematic illustration of multiple axes of documents disposed in a longitudinal and parallel arrangement and an axis of documents disposed at a non-zero angle thereof with active documents thereon in accordance with an exemplary embodiment of the present invention.
Figure 27:
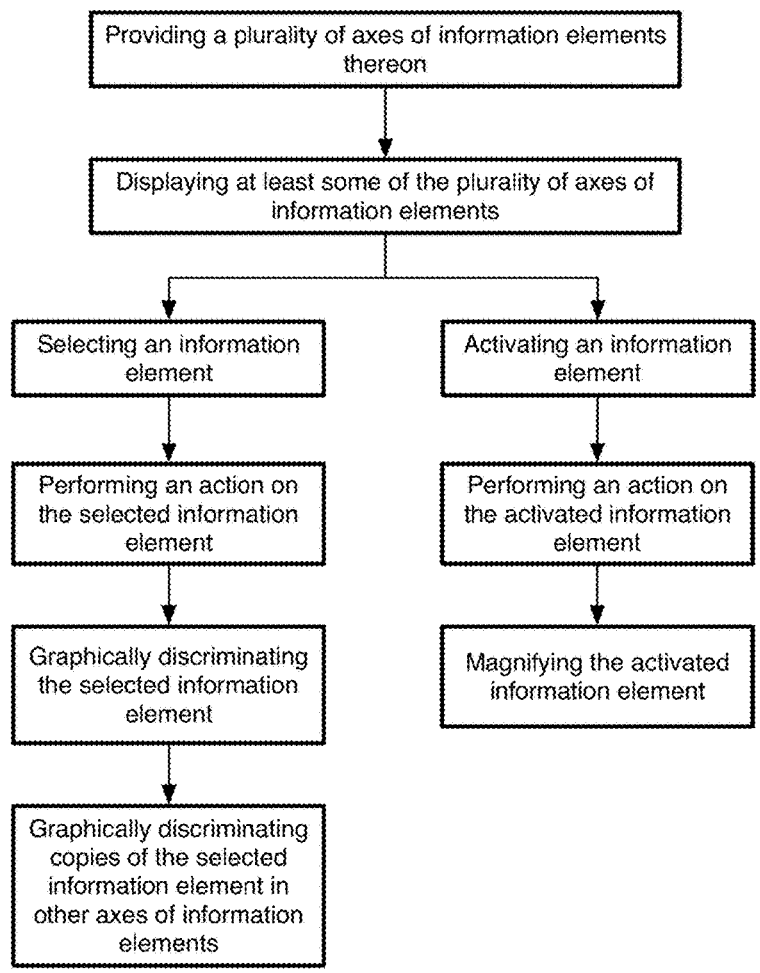
FIG. 27 is a schematic illustration of a block diagram in accordance with an exemplary embodiment of the present invention.
Figure 28:
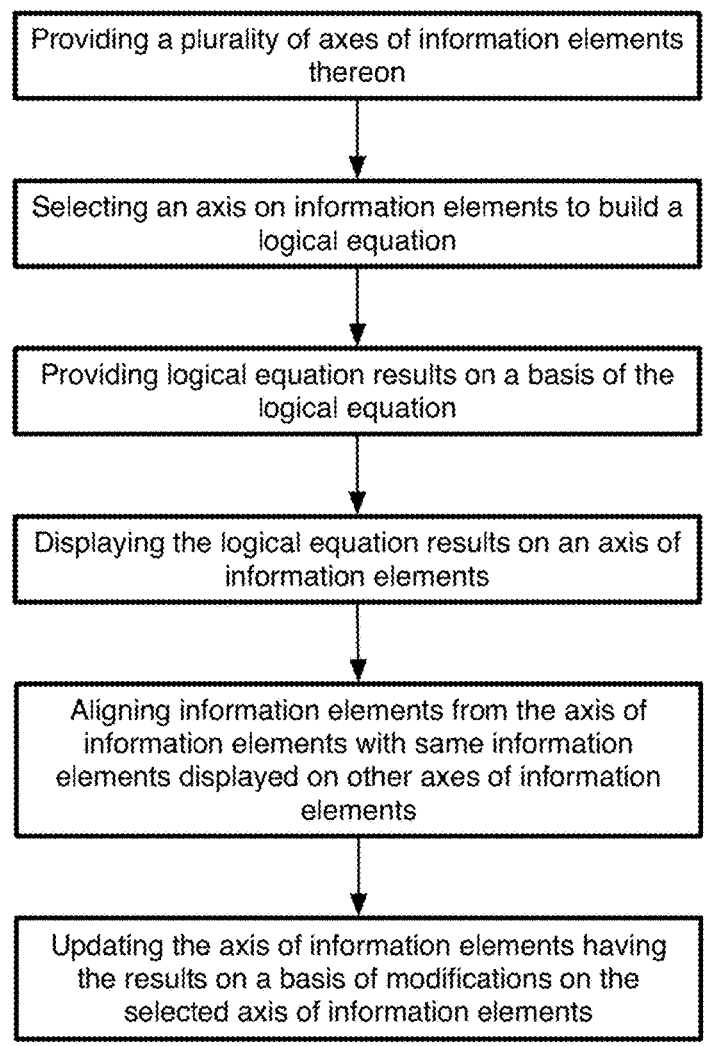
FIG. 28 is a schematic illustration of a block diagram in accordance with an exemplary embodiment of the present invention.
Figure 29:
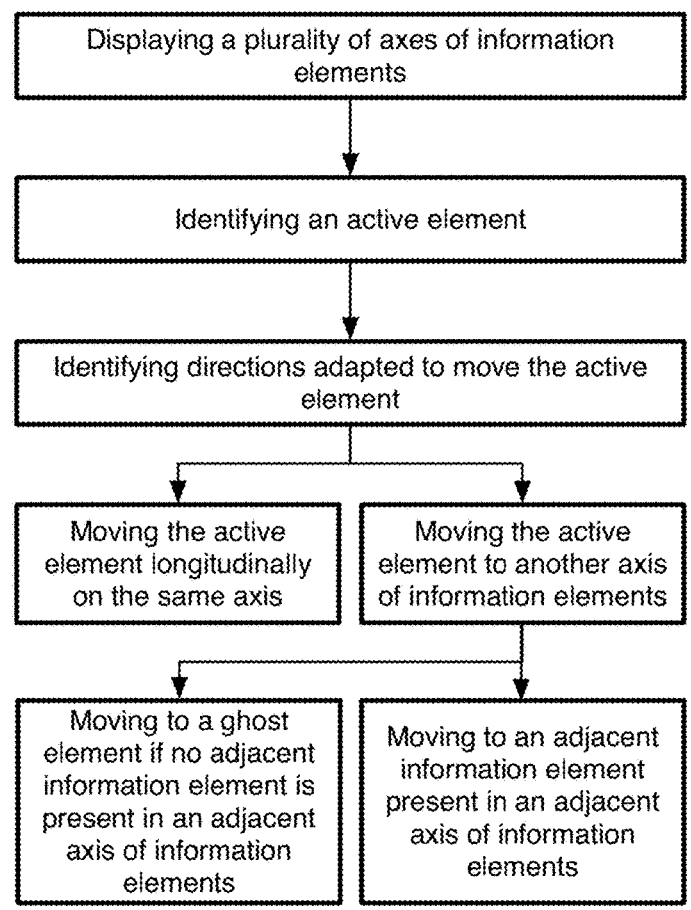
FIG. 29 is a schematic illustration of a block diagram in accordance with an exemplary embodiment of the present invention.

FIG. 26 illustrates a sequence of navigation beginning with document 370 on axis A 202 that is going to reach document 374 and not changes direction downward to reach document 376 on axis D 202. Now, navigation from document 376 is embodied to directly reach document 380. Document 380 is an intersecting document between axis D 202 and axis 1202. For example, axis D includes documents 200 having a common attribute "D" and axis 1202, provides documents 200 having common attributes "D" and "I". Navigation on axis 1202 can therefore be made in the direction of axis 1202, vertically, since axis 1202, is illustrated vertically, orthogonal to the other axes 202.

Finally, the present specification has recited many possible embodiments that can be practiced independently and/or collectively, if desirable. It is considered that the text of the present specification has been drafted as it is for helping a reader to understand many different embodiments taken independently and is not intended to limit the scope of any of the embodiments or combinations thereof.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium having stored thereon computer-executable instructions that, when executed by a processor of a computer system, provide a method of simultaneously selecting a user-selectable element displayed on a plurality of independent axes of user-selectable elements, the method comprising:

causing a plurality of independent axes of user-selectable elements to be concurrently displayed on a display, the axes of user-selectable elements displaying user selectable elements thereon on a basis of different queries;

selecting a user-selectable element from a first displayed axes of user-selectable elements on a basis of a user input, the selection of the user-selectable element from the first displayed axis also activating the first axis thereof, the activation of the first axis of user-selectable elements allowing an operation applied a thereon; and automatically selecting other occurrences of the selected user-selectable element displayed in other independent axis of user-selectable elements when the selected user-selectable element includes at least one other occurrence thereof concurrently displayed in at least one other independent axis of computer-readable files, the selection of other occurrences of the user-selectable elements allowing an operation applied thereon on a basis of an operation applied on the selected user-selectable element from the first displayed axis.

2. The non-transitory computer-readable medium of claim 1, wherein an operation applied on the selected at least one other occurrence of the selected user-selectable element is also applied on the selected user-selectable element from the first displayed axis.

3. The non-transitory computer-readable medium of claim 1, wherein at least some of the user-selectable elements are computer-readable files of the selected user-selectable element.

4. The non-transitory computer-readable medium of claim 1, wherein the axis of user-selectable elements of the selected user-selectable element and the other axes of user-selectable elements are displayed adjacent and parallel to each other.

5. The non-transitory computer-readable medium of claim 4, wherein the selected user-selectable element and the at least one other occurrence in other axes are axially located on respective axes of user-selectable elements to be displayed transversally aligned in respect with each other.

6. The non-transitory computer-readable medium of claim 1, wherein the selected user-selectable element and the at least one other occurrence of the selected user-selectable element are graphically differentiated from other non-selected user-selectable elements.

7. The non-transitory computer-readable medium of claim 6, wherein the selected user-selectable element and the at least one other occurrence of the selected user-selectable element are graphically differentiated from other non-selected user-selectable elements in a similar manner.

8. The non-transitory computer-readable medium of claim 1, wherein the selected user-selectable element and the at least one other occurrence of the selected user-selectable element are displayed in axes of user-selectable elements forming a group of axes thereof.

9. The non-transitory computer-readable medium of claim 1, wherein activated axis of user-selectable elements is graphically differentiated from non-selected axes of user-selectable elements.

10. A computerized system configured to read computer-executable instructions adapted to enable a program enabling an interface adapted to display axes of computer-readable files and identify an active computer-readable file thereon, the computerized system comprising:

a processing unit configured to process the computer executable instructions; and a display operatively connected to the processing unit and configured to display the interface;

the program, when executed, being operative to:

cause a plurality of independent axes of user-selectable elements to be concurrently displayed on a display, the axes of user-selectable elements displaying user selectable elements thereon on a basis of different queries;

select a user-selectable element from a first displayed axes of user-selectable elements on a basis of a user input, the selection of the user-selectable element from the first displayed axis also activating the first axis thereof, the activation of the first axis of user-selectable elements allowing an operation applied thereon; and automatically selecting other occurrences of the selected user-selectable element displayed in other independent axes of user-selectable elements when the selected user-selectable element includes at least one other occurrence thereof concurrently displayed in at least one other independent axis of computer-readable files, the selection of other occurrences of the user-selectable elements allowing an operation applied thereon on a basis of an operation applied on the selected user-selectable element from the first displayed axis.

11. The computerized system of claim 10, wherein an operation applied on the selected at least one other occurrence of the selected user-selectable element is also applied on the selected user-selectable element from the first displayed axis.

12. The computerized system of claim 10, wherein at least some of the user-selectable elements are computer-readable files of the selected user-selectable element.

13. The computerized system of claim 10, wherein the axis of user-selectable element of the selected user-selectable element and the other axes of user-selectable elements are displayed adjacent and parallel to each other.

14. The computerized system of claim 10, wherein the selected user-selectable element and the at least one other occurrence in other axes are axially located on respective axes of user-selectable elements to be displayed transversally aligned in respect with each other.

15. The computerized system of claim 10, wherein the selected user-selectable element and the at least one other occurrence of the selected user-selectable element are graphically differentiated from other non-selected user-selectable elements.

16. The computerized system of claim 15, wherein the selected user-selectable element and the at least one other occurrence of the selected user-selectable element are graphically differentiated from other non-selected user-selectable elements in a similar manner.

17. The computerized system of claim 10, wherein the selected user-selectable element and the at least one other occurrence of the selected user-selectable element are displayed in axes of user-selectable elements forming a group of axes thereof.

18. The computerized system of claim 10, wherein activated axis of user-selectable elements is graphically differentiated from non-selected axes of user-selectable elements.

* * * * *